US011729759B2

(12) United States Patent
Sun et al.

(10) Patent No.: US 11,729,759 B2
(45) Date of Patent: Aug. 15, 2023

(54) GROUP REFERENCE SIGNAL TRIGGERING FOR CONTENTION-BASED SYSTEMS

(71) Applicant: QUALCOMM Incorporated, San Diego, CA (US)

(72) Inventors: Jing Sun, San Diego, CA (US); Kapil Bhattad, Bangalore (IN); Xiaoxia Zhang, San Diego, CA (US); Tanumay Datta, Bangalore (IN); Ananta Narayanan Thyagarajan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 16/814,759

(22) Filed: Mar. 10, 2020

(65) Prior Publication Data
US 2020/0314871 A1   Oct. 1, 2020

(30) Foreign Application Priority Data

Mar. 29, 2019   (IN) ............................. 201941012461

(51) Int. Cl.
| | |
|---|---|
| *H04W 72/121* | (2023.01) |
| *H04W 24/10* | (2009.01) |
| *H04W 76/27* | (2018.01) |
| *H04W 74/08* | (2009.01) |

(Continued)

(52) U.S. Cl.
CPC ......... *H04W 72/121* (2013.01); *H04L 5/0048* (2013.01); *H04W 24/10* (2013.01); *H04W 72/23* (2023.01); *H04W 74/0808* (2013.01); *H04W 76/27* (2018.02)

(58) Field of Classification Search
CPC ... H04W 72/121; H04W 24/10; H04W 76/27; H04W 74/0808; H04W 72/042; H04L 5/0048
See application file for complete search history.

(56) References Cited

U.S. PATENT DOCUMENTS

| | | | |
|---|---|---|---|
| 10,506,586 B2 * | 12/2019 | Lee | ........................ H04W 72/12 |
| 2017/0331606 A1 | 11/2017 | Chen et al. | |
| 2019/0013909 A1 * | 1/2019 | Li | ........................ H04L 25/0226 |

(Continued)

OTHER PUBLICATIONS

M. Elsaadany, A. Ali and W. Hamouda, "Cellular LTE-A Technologies for the Future Internet-of-Things: Physical Layer Features and Challenges," in IEEE Communications Surveys & Tutorials, vol. 19, No. 4, pp. 2544-2572, Fourthquarter 2017, doi: 10.1109/COMST.2017.2728013. (Year: 2017).*

(Continued)

*Primary Examiner* — Justin T Van Roie
(74) *Attorney, Agent, or Firm* — Holland & Hart LLP

(57) ABSTRACT

This disclosure provides systems, methods, and apparatus, including computer programs encoded on computer storage media, for group reference signal triggering for contention-based systems. The described techniques may enable a network node to trigger a group of one or more user equipments (UEs) to transmit a reference signal to the network node. The network node may transmit a group common control channel indicating timing information or configuration information corresponding to a set of resources for the transmission of the reference signal. The one or more UEs may transmit the reference signal according to the timing information or configuration information.

30 Claims, 15 Drawing Sheets

(51) Int. Cl.
  *H04L 5/00*  (2006.01)
  *H04W 72/23*  (2023.01)

(56) References Cited

U.S. PATENT DOCUMENTS

| | | | | |
|---|---|---|---|---|
| 2019/0215870 | A1* | 7/2019 | Babaei | H04W 24/10 |
| 2020/0045738 | A1* | 2/2020 | Oh | H04W 16/14 |
| 2020/0412581 | A1* | 12/2020 | Zhang | H04L 5/0094 |
| 2021/0167920 | A1* | 6/2021 | Cha | H04L 5/0048 |
| 2021/0184801 | A1* | 6/2021 | El Hamss | H04L 1/1854 |

OTHER PUBLICATIONS

Huawei, et al., "SRS Configurations for eLAA", 3GPP Draft, R1-164074, 3rd Generation Partnership Project (3GPP), Mobile Competence Centre, 650, Route Des Lucioles, F-06921 Sophia-Antipolis Cedex, France, vol. RAN WG1, No. Nanjing, China, May 23, 2016-May 27, 2016, May 14, 2016 (May 14, 2016), XP051096610, 4 pages, Retrieved from the Internet: URL: http://www.3gpp.org/ftp/tsg_ran/WG1_RL1/TSGR1_85/Docs/. [retrieved on May 14, 2016] chapters 1, 3-5.

International Search Report and Written Opinion—PCT/US2020/022024—ISA/EPO—dated May 27, 2020.

NTT Docomo, et al., "Channel Access Procedures for NR-U", 3GPP Draft, R1-1902789, Channel Access Procedures for NR-U Final, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051600484, 3 pages, Retrieved from the Internet: URL: http://www.3gpp.org/ftp/tsg%5Fran/WG1%5FRL1/TSGR1%5F96/Docs/R1%2D1902789%2Ezip. [retrieved on Feb. 15, 2019] chapters 1, 2.

Samsung: "Remaining Issue of SRS Transmission", 3GPP Draft, R1-164746, 3rd Generation Partnership Project (3GPP), Mobile Competence Centre, 650, Route Des Lucioles, F-06921 Sophia-Antipolis Cedex, France, vol. RAN WG1, No. Nanjing, China, May 23, 2016-May 27, 2016, May 14, 2016 (May 14, 2016), XP051096337, 4 pages, Retrieved from the Internet: URL: http://www.3gpp.org/ftp/tsg_ran/WG1_RL1/TSGR1_85/Docs/. [retrieved on May 14, 2016] chapters 1, 2.

* cited by examiner

GROUP REFERENCE SIGNAL TRIGGERING FOR CONTENTION-BASED SYSTEMS

CROSS REFERENCE

The present Application for Patent claims the benefit of India Provisional Patent Application No. 201941012461 by SUN et al., entitled "GROUP REFERENCE SIGNAL TRIGGERING FOR CONTENTION-BASED SYSTEMS," filed Mar. 29, 2019, assigned to the assignee hereof, and expressly incorporated herein.

TECHNICAL FIELD

The following relates generally to wireless communications systems, and more specifically to group triggered reference signaling for contention-based systems.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a wireless device such as a base station may configure a UE to transmit a sounding reference signal (SRS), which may be used for channel estimation. In some implementations, the UE and the base station may communicate in a contention-based system (such as New Radio Unlicensed (NR-U)). Wireless devices in such a system may operate following a listen before talk (LBT) procedure prior to communicating over a channel. For example, devices may communicate using a shared radio frequency spectrum band (such as an unlicensed radio frequency spectrum band) after a determination that the channel is clear and available for use (such as after a clear channel assessment (CCA) procedure). In some implementations, a wireless node, or a network node, such as a base station may perform an LBT procedure and acquire a channel for communications for a channel occupancy time (COT).

Current methods of reference signaling, such as for SRS communication in contention-based systems, may inefficiently use the COT and lead to poor performance or failed transmissions. More robust methods for reference signaling may be desired.

SUMMARY

The systems, methods and devices of this disclosure each have several innovative aspects, no single one of which is solely responsible for the desirable attributes disclosed herein.

One innovative aspect of the subject matter described in this disclosure may be implemented in an apparatus for wireless communications such as a user equipment (UE). The apparatus may include a first interface, a second interface, and a processor. Instructions may be executable by the processor to cause the first interface to obtain a group common control channel configured to trigger transmission of a reference signal from a number of UEs including the UE, the group common control channel indicating timing information for transmission of the reference signal. Additionally, the processor may determine a set of time-frequency resources of the shared radio frequency band for transmission of the reference signal based at least in part on the timing information. Instructions may be further executable by the processor to cause the second interface to output the reference signal for transmission via the set of time-frequency resources according to the timing information.

Another innovative aspect of the subject matter described in this disclosure may be implemented in a method of wireless communications at a UE. The method may include receiving a group common control channel configured to trigger transmission of a reference signal from a set of UEs including the UE, the group common control channel indicating timing information for transmission of the reference signal, determining a set of time-frequency resources of a shared radio frequency band for transmission of the reference signal based on the timing information, and transmitting the reference signal to the base station via the set of time-frequency resources according to the timing information.

Another innovative aspect of the subject matter described in this disclosure may be implemented in an apparatus for wireless communications at a UE. The apparatus may include means for receiving a group common control channel configured to trigger transmission of a reference signal from a set of UEs including the UE, the group common control channel indicating timing information for transmission of the reference signal, determining a set of time-frequency resources of a shared radio frequency band for transmission of the reference signal based on the timing information, and transmitting the reference signal to the base station via the set of time-frequency resources according to the timing information.

Another innovative aspect of the subject matter described in this disclosure may be implemented in a non-transitory computer-readable medium storing code for wireless communications at a UE. The code may include instructions executable by a processor to receive a group common control channel configured to trigger transmission of a reference signal from a set of UEs including the UE, the group common control channel indicating timing information for transmission of the reference signal, determine a set of time-frequency resources of a shared radio frequency band for transmission of the reference signal based on the timing information, and transmit the reference signal to the base station via the set of time-frequency resources according to the timing information.

In some implementations, the method, apparatuses, and non-transitory computer-readable medium described herein may further include operations, features, means, or instructions for performing a listen before talk (LBT) procedure to access the shared radio frequency band, and transmitting the reference signal over a channel of the shared radio frequency band based on a successful LBT procedure.

In some implementations, the method, apparatuses, and non-transitory computer-readable medium described herein may further include operations, features, means, or instructions for determining time resources of the set of time-frequency resources for transmission of the reference signal based on a channel occupancy time (COT) of the base station, where the time resources may be within an interval associated with the COT.

In some implementations, the method, apparatuses, and non-transitory computer-readable medium described herein may further include operations, features, means, or instructions for identifying downlink control information (DCI) in the group common control channel, where a format of the DCI excludes a power control command.

In some implementations, the method, apparatuses, and non-transitory computer-readable medium described herein may further include operations, features, means, or instructions for identifying DCI in the group common control channel, where a format of the DCI includes a power control command, and receiving a radio resource control (RRC) configuration from the base station, where the RRC configuration includes an indication to ignore the power control command.

In some implementations, the method, apparatuses, and non-transitory computer-readable medium described herein may further include operations, features, means, or instructions for identifying a respective set of time-frequency resources for a group of UEs including the UE based on an indication within the group common control channel.

In some implementations, the method, apparatuses, and non-transitory computer-readable medium described herein may further include operations, features, means, or instructions for receiving an RRC transmission time interval offset for transmission of the reference signal via RRC signaling, identifying a timing adjustment field from the timing information in the group common control channel, the timing adjustment field indicating an offset adjustment relative to the RRC transmission time interval offset for transmission of the reference signal, and transmitting the reference signal based on the offset adjustment.

In some implementations of the method, apparatuses, and non-transitory computer-readable medium described herein, the timing adjustment field may be configured for a group of UEs including the UE.

In some implementations, the method, apparatuses, and non-transitory computer-readable medium described herein may further include operations, features, means, or instructions for identifying a starting offset for transmission of the reference signal from the timing information of the group common control channel, the starting offset indicating a start time of a transmission time interval for transmission of the reference signal, and transmitting the reference signal based on the starting offset.

In some implementations of the method, apparatuses, and non-transitory computer-readable medium described herein, the starting offset may be configured for multiple UEs of the set of UEs.

In some implementations of the method, apparatuses, and non-transitory computer-readable medium described herein, the starting offset may be configured for a group of UEs including the UE.

In some implementations, the method, apparatuses, and non-transitory computer-readable medium described herein may further include operations, features, means, or instructions for identifying an LBT category for transmission of the reference signal based on an indication within the group common control channel, performing an LBT procedure corresponding to the LBT category to access the shared radio frequency band, and transmitting the reference signal over a channel of the shared radio frequency band based on a successful LBT procedure.

In some implementations of the method, apparatuses, and non-transitory computer-readable medium described herein, the reference signal includes a sounding reference signal (SRS).

Another innovative aspect of the subject matter described in this disclosure may be implemented in an apparatus for wireless communications such as a base station. The apparatus may include a first interface, a second interface, and a processor. The processor may identify a set of time-frequency resources of a shared radio frequency band for transmission of respective reference signals from each UE of a number of UEs. Instructions may be executable by the processor to cause the first interface to output for transmission a group common control channel configured to trigger transmission of a reference signal from a UE of the number of UEs, the group common control channel indicating timing information corresponding to the set of time-frequency resources for transmission of the respective reference signals. Additionally, the processor may monitor a second interface for at least one of the respective reference signals based at least in part on the timing information and the set of time-frequency resources.

Another innovative aspect of the subject matter described in this disclosure may be implemented in a method of wireless communications. The method may include identifying a set of time-frequency resources of a shared radio frequency band for transmission of respective reference signals from each UE of a set of UEs, transmitting a group common control channel configured to trigger transmission of a reference signal from a UE of the set of UEs, the group common control channel indicating timing information corresponding to the set of time-frequency resources for transmission of the respective reference signals, and monitoring for at least one of the respective reference signals based on the timing information and the set of time-frequency resources.

Another innovative aspect of the subject matter described in this disclosure may be implemented in an apparatus for wireless communications. The apparatus may include means for identifying a set of time-frequency resources of a shared radio frequency band for transmission of respective reference signals from each UE of a set of UEs, transmitting a group common control channel configured to trigger transmission of a reference signal from a UE of the set of UEs, the group common control channel indicating timing information corresponding to the set of time-frequency resources for transmission of the respective reference signals, and monitoring for at least one of the respective reference signals based on the timing information and the set of time-frequency resources.

Another innovative aspect of the subject matter described in this disclosure may be implemented in a non-transitory computer-readable medium storing code for wireless communications. The code may include instructions executable by a processor to identify a set of time-frequency resources of a shared radio frequency band for transmission of respective reference signals from each UE of a set of UEs, transmit a group common control channel configured to trigger transmission of a reference signal from a UE of the set of UEs, the group common control channel indicating timing information corresponding to the set of time-frequency resources for transmission of the respective reference signals, and monitor for at least one of the respective reference signals based on the timing information and the set of time-frequency resources.

In some implementations, the method, apparatuses, and non-transitory computer-readable medium described herein may further include operations, features, means, or instructions for performing an LBT procedure to access the shared radio frequency band, gaining access to the shared radio frequency band for a COT based on a successful LBT procedure, and identifying the set of time-frequency resources based on the COT.

In some implementations, the method, apparatuses, and non-transitory computer-readable medium described herein may further include operations, features, means, or instructions for determining time resources of the set of time-frequency resources based on the COT, where the time resources may be within an interval associated with the COT.

In some implementations, the method, apparatuses, and non-transitory computer-readable medium described herein may further include operations, features, means, or instructions for including DCI in the group common control channel, where a format of the DCI excludes a power control command.

In some implementations, the method, apparatuses, and non-transitory computer-readable medium described herein may further include operations, features, means, or instructions for including DCI in the group common control channel, where a format of the DCI includes a power control command, and transmitting an RRC configuration to the UE, where the RRC configuration includes an indication to ignore the power control command.

In some implementations, the method, apparatuses, and non-transitory computer-readable medium described herein may further include operations, features, means, or instructions for determining respective sets of time-frequency resources for respective UEs of the set of UEs, where the group common control channel includes an indication of the respective sets of time-frequency resources.

In some implementations, the method, apparatuses, and non-transitory computer-readable medium described herein may further include operations, features, means, or instructions for configuring an RRC transmission time interval offset for transmission of the reference signal, and including a timing adjustment field in the group common control channel, the timing adjustment field indicating an offset adjustment relative to the RRC transmission time interval offset for transmission of the reference signal, where the timing information indicates the timing adjustment field.

In some implementations, the method, apparatuses, and non-transitory computer-readable medium described herein may further include operations, features, means, or instructions for configuring respective timing adjustment fields for respective groups of UEs of the set of UEs, where the respective timing adjustment fields may be included in the timing information of the group common control channel.

In some implementations, the method, apparatuses, and non-transitory computer-readable medium described herein may further include operations, features, means, or instructions for transmitting an indication of the configured RRC transmission time interval offset via RRC signaling.

In some implementations, the method, apparatuses, and non-transitory computer-readable medium described herein may further include operations, features, means, or instructions for configuring a starting offset for transmission of the reference signal, the starting offset indicating a start time of a transmission time interval for transmission of the reference signal, and including an indication of the starting offset in the group common control channel, where the timing information indicates the starting offset.

In some implementations of the method, apparatuses, and non-transitory computer-readable medium described herein, the starting offset may be configured for multiple UEs of the set of UEs.

In some implementations, the method, apparatuses, and non-transitory computer-readable medium described herein may further include operations, features, means, or instructions for configuring respective starting offsets for respective groups of UEs of the set of UEs, where the respective starting offsets may be included in the timing information of the group common control channel.

In some implementations, the method, apparatuses, and non-transitory computer-readable medium described herein may further include operations, features, means, or instructions for identifying an LBT category for transmission of the reference signal, and including an indication of the LBT category in the group common control channel.

In some implementations of the method, apparatuses, and non-transitory computer-readable medium described herein, the reference signal includes an SRS.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
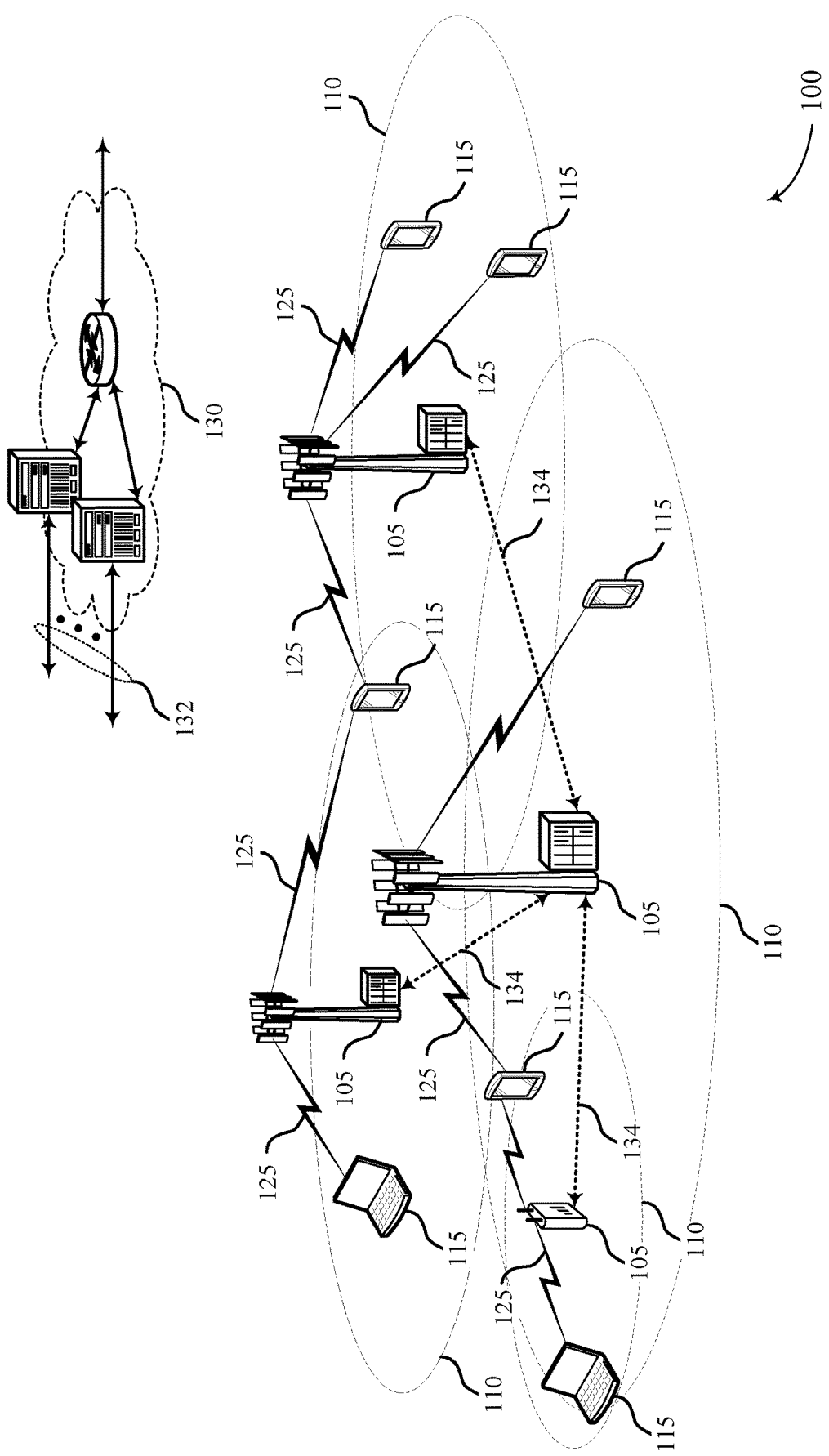
FIGS. 1 and 2 show examples of wireless communications systems.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some wireless communications systems (such as in a contention-based system such as New Radio Unlicensed (NR-U)), devices may operate following a listen before talk (LBT) procedure prior to communicating over a channel. For example, devices may communicate using a shared radio frequency spectrum band (such as an unlicensed radio frequency spectrum band) after a determination that the channel is clear and available for use. A wireless device that has data to transmit on the shared radio frequency spectrum band may first perform an LBT procedure, such as a clear channel assessment (CCA) procedure, to determine whether other wireless devices are currently using (i.e., communicating over) the shared radio frequency spectrum band. If the shared radio frequency spectrum band is available, the wireless device may transmit after completing the LBT procedure. If unavailable, the wireless device may perform a subsequent LBT procedure at a later time before attempting to transmit on the shared radio frequency spectrum band. Such an LBT procedure may help devices avoid transmitting using the same resources or channels, which may otherwise result in collisions of transmissions.

In some implementations, a wireless node such as a base station may perform an LBT procedure and obtain channel access for a channel occupancy time (COT). The wireless node may indicate to a user equipment (UE) that it has acquired a channel for communications for the COT. The wireless node also may indicate information related to the COT, such as a length of time the wireless node holds the channel, resources for the UE to utilize, etc.

The disclosure herein provides for triggering reference signals (such as a sounding reference signal (SRS)) for one or more wireless devices. SRSs may be used to improve channel estimation for uplink transmissions. For example, a UE may transmit an SRS to facilitate error correction and data transmission. In some implementations, a wireless communications system may support periodic SRSs. For instance, a UE may be configured (such as by radio resource control (RRC) signaling) to transmit an SRS following a periodic cycle. In some implementations, a wireless communications system may utilize aperiodic SRSs (A-SRSs). For example, the UE may be configured to transmit an SRS based on receiving a trigger, such as an SRS request in received downlink control information (DCI). A-SRSs may allow for SRS transmissions that dynamically utilize a wireless node (such as a gNB) COT. That is, A-SRSs may enable a wireless node to receive status updates from a UE when the wireless node has obtained a COT in a shared radio frequency spectrum band (such as an unlicensed radio frequency spectrum band).

In some implementations, A-SRSs may be triggered for a group of UEs. For example, information transmitted via a group-common physical downlink control channel (GC-PDCCH) may trigger one or more UEs to transmit an SRS. The GC-PDCCH may include DCI and may be monitored by the group of UEs. The GC-PDCCH also may include SRS information such as a triggering field, a timing adjustment field, a starting offset control field, an LBT type field, or any combination thereof.

In some implementations, the triggering field may result in the UEs transmitting SRSs to the wireless node. For example, the triggering field may be included in a DCI format transmitted via the GC-PDCCH. The DCI format may, in some implementations, include other information related to SRS transmissions (such as SRS parameters, transmit power control (TPC) commands, etc.). In some other implementations, the DCI format may include the triggering field without the TPC command.

The UEs may transmit the SRSs according to the received SRS information. In some implementations, the UEs may determine timing information (such as timing information for transmitting the SRSs) from the SRS information. For example, each UE may monitor the GC-PDCCH and may determine timing information (such as a slot offset or a starting symbol) from the timing adjustment field or starting offset control field.

The UEs also may determine LBT information from the received SRS information. For example, the UEs may, in some implementations, monitor the GC-PDCCH for an LBT type field. A UE may determine, based on the LBT type field, an LBT category (such as CAT 1, CAT 2, or CAT 4) for performing an LBT procedure before transmitting.

Additionally, or alternatively, the UEs may determine SRS information (such as timing information, SRS resources, or configuration information) from an RRC configuration. For example, the UEs may be configured by the RRC configuration with timing information, such as a starting symbol or an offset. A UE may have an RRC configured slot offset that may be dynamically adjusted with a timing adjustment field received in the GC-PDCCH. In some implementations, the UE may use the RRC configuration to determine other SRS information. For example, an RRC configuration may configure the UE to ignore a TPC command in a received DCI. In some implementations, the UE may not receive SRS information in the GC-PDCCH (such as a starting offset field, a timing adjustment field, etc.) and may rely on RRC configured timing information instead.

Particular implementations of the subject matter described in this disclosure may be implemented to realize one or more of the following potential advantages. Triggering reference signals in the described manner may enable more effective utilization of an acquired COT in a contention-based system. For example, triggering multiple UEs in a relatively short time span (such as the same resource in a GC-PDCCH) may enable a wireless node, which may be referred to as a network node, to more effectively utilize an acquired COT for receiving an SRS transmission. That is, the wireless node may more effectively utilize resources, control capability, and processing power in triggering SRSs. Additionally, the GC-PDCCH may include SRS information. The SRS information may enable dynamic timing adjustment, dynamic starting offset, and explicit or implicit LBT type signaling for SRS communications and scheduling.

FIG. 1 shows an example of a wireless communications system 100 that supports group triggered reference signaling for wireless communications. The wireless communications system 100 includes base stations 105, UEs 115, and a core network 130. In some implementations, the wireless communications system 100 may be an LTE network, an LTE-Advanced (LTE-A) network, an LTE-A Pro network, or a New Radio (NR) network. In some implementations, wireless communications system 100 may support enhanced broadband communications, ultra-reliable (such as mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (such as macro or small cell base stations). The UEs 115 described herein may be able to communicate with various types of base stations 105 and network equipment including macro eNBs, small cell eNBs, gNBs, relay base stations, and the like.

Each base station 105 may be associated with a geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions also may be called forward link transmissions while uplink transmissions also may be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some implementations, a base station 105 may be movable and therefore provide communication coverage for a moving geographic coverage area 110. In some implementations, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (such as over a carrier) and may be associated with an identifier for distinguishing neighboring cells (such as a physical cell identifier (PCID), a virtual cell identifier (VCID)) operating via the same or a different carrier. In some implementations, a carrier may support multiple cells, and different cells may be configured according to different protocol types (such as machine-type communication (MTC), narrowband Internet-of-Things (NB-IoT), enhanced mobile broadband (eMBB), or others) that may provide access for different types of devices. In some implementations, the term "cell" may refer to a portion of a geographic coverage area 110 (such as a sector) over which the logical entity operates.

UEs 115 may be dispersed throughout the wireless communications system 100, and each UE 115 may be stationary or mobile. A UE 115 also may be referred to as a mobile device, a wireless device, a remote device, a handheld device, or a subscriber device, or some other suitable terminology, where the "device" also may be referred to as a unit, a station, a terminal, or a client. A UE 115 also may be a personal electronic device such as a cellular phone, a personal digital assistant (PDA), a tablet computer, a laptop computer, or a personal computer. In some implementations, a UE 115 also may refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (such as via Machine-to-Machine (M2M) communication). M2M communication or MTC may refer to data communication technologies that allow devices to communicate with one another or a base station 105 without human intervention. In some implementations, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (such as a mode that supports one-way communication via transmission or reception, but not transmission and reception simultaneously). In some implementations half-duplex communications may be performed at a reduced peak rate. Other power conservation techniques for UEs 115 include entering a power saving "deep sleep" mode when not engaging in active communications or operating over a limited bandwidth (such as according to narrowband communications). In some implementations, UEs 115 may be designed to support critical functions (such as mission critical functions), and a wireless communications system 100 may be configured to provide ultra-reliable communications for these functions.

In some implementations, a UE 115 also may be able to communicate directly with other UEs 115 (such as using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or may be otherwise unable to receive transmissions from a base station 105. In some implementations, groups of UEs 115 communicating via D2D communications may utilize a one-to-many (1:M) system in which each UE 115 transmits to every other UE 115 in the group. In some implementations, a base station 105 facilitates the scheduling of resources for D2D communications. In some other implementations, D2D communications are carried out between UEs 115 without the involvement of a base station 105.

Base stations 105 may communicate with the core network 130 and with one another. For example, base stations 105 may interface with the core network 130 through backhaul links 132 (such as via an S1, N2, N3, or another interface). Base stations 105 may communicate with one another over backhaul links 134 (such as via an X2, Xn, or other interface) either directly (such as directly between base stations 105) or indirectly (such as via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (such as control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (such as radio heads and access network controllers) or consolidated into a single network device (such as a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (such as less than 100 km) compared to transmission using the smaller frequencies and longer waves of the high frequency (HF) or very high frequency (VHF) portion of the spectrum below 300 MHz.

Wireless communications system 100 also may operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 also may operate in an extremely high frequency (EHF) region of the spectrum (such as from 30 GHz to 300 GHz), also known as the millimeter band. In some implementations, wireless communications system 100 may support millimeter wave (mmW) communications between UEs 115 and base stations 105, and EHF antennas of the respective devices may be even smaller and more closely spaced than UHF antennas. In some implementations, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some implementations, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some implementations, operations in unlicensed bands may be based on a carrier aggregation configuration in conjunction with component carriers operating in a licensed band (such as LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some implementations, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (such as a base station 105) and a receiving device (such as a UE 115), where the transmitting device may be equipped with multiple antennas and the receiving device may be equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (such as the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which also may be referred to as spatial filtering, directional transmission, or directional reception, is a signal processing technique that may be used at a transmitting device or a receiving device (such as a base station 105 or a UE 115) to shape or steer an antenna beam (such as a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (such as with respect to the antenna array of the transmitting device or receiving device, or with respect to some other orientation).

In one example, a base station 105 may use multiple antennas or antenna arrays to conduct beamforming operations for directional communications with a UE 115. For instance, some signals (such as synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (such as by the base station 105 or a receiving device, such as a UE 115) a beam direction for subsequent transmission or reception by the base station 105.

Some signals, such as data signals associated with a particular receiving device, may be transmitted by a base station 105 in a single beam direction (such as a direction associated with the receiving device, such as a UE 115). In some implementations, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (such as for identifying a beam direction for subsequent transmission or reception by the UE 115), or transmitting a signal in a single direction (such as for transmitting data to a receiving device).

A receiving device (such as a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a number of antenna elements of an antenna array, or by processing received signals according to different receive beamforming weight sets applied to signals received at a number of antenna elements of an antenna array, any of which may be referred to as "listening" according to different receive beams or receive directions. In some implementations a receiving device may use a single receive beam to receive along a single beam direction (such as when receiving a data signal). The single receive beam may be aligned in a beam direction determined based at least in part on listening according to different receive beam directions (such as a beam direction determined to have a highest signal strength, highest signal-to-noise ratio, or otherwise acceptable signal quality based at least in part on listening according to multiple beam directions).

In some implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some implementations, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some implementations, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some implementations, UEs 115 and base stations 105 may support retransmissions of data to increase the likelihood that data is received successfully. HARQ feedback is one technique of increasing the likelihood that data is received correctly over a communication link 125. HARQ may include a combination of error detection (such as using a cyclic redundancy check (CRC)), forward error correction (FEC), and retransmission (such as automatic repeat request (ARQ)). HARQ may improve throughput at the MAC layer in poor radio conditions (such as signal-to-noise conditions). In some implementations, a wireless device may support same-slot HARQ feedback, where the device may provide HARQ feedback in a specific slot for data received in a previous symbol in the slot. In some other implementations, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (such as depending on the length of the cyclic prefix prepended to each symbol period). Excluding the cyclic prefix, each symbol period may contain 2048 sampling periods. In some implementations, a subframe may be the smallest scheduling unit of the wireless communications system 100 and may be referred to as a transmission time interval (TTI). In some other implementations, a smallest scheduling unit of the wireless communications system 100 may be shorter than a subframe or may be dynamically selected (such as in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (such as an evolved universal mobile telecommunication system terrestrial radio access (E-UTRA) absolute radio frequency channel number (EARFCN)) and may be positioned according to a channel raster for discovery by UEs 115. Carriers may be downlink or uplink (such as in an FDD mode) or be configured to carry downlink and uplink communications (such as in a TDD mode). In some implementations, signal waveforms transmitted over a carrier may be made up of multiple sub-carriers (such as using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (such as LTE, LTE-A, LTE-A Pro, NR). For example, communications over a carrier may be organized according to TTIs or slots, each of which may include user data as well as control information or signaling to support decoding the user data. A carrier also may include dedicated acquisition signaling (such as synchronization signals or system information, etc.) and control signaling that coordinates operation for the carrier. In some implementations (such as in a carrier aggregation configuration), a carrier also may have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some implementations, control information transmitted in a physical control channel may be distributed between different control regions in a cascaded manner (such as between a common control region or common search space and one or more UE-specific control regions or UE-specific search spaces).

A carrier may be associated with a particular bandwidth of the radio frequency spectrum, and in some implementations the carrier bandwidth may be referred to as a "system bandwidth" of the carrier or the wireless communications system 100. For example, the carrier bandwidth may be one of a number of predetermined bandwidths for carriers of a particular radio access technology (such as 1.4, 3, 5, 10, 15, 20, 40, or 80 MHz). In some implementations, each served UE 115 may be configured for operating over portions or all of the carrier bandwidth. In some other examples, some UEs 115 may be configured for operation using a narrowband protocol type that is associated with a predefined portion or range (such as set of subcarriers or RBs) within a carrier (such as "in-band" deployment of a narrowband protocol type).

In a system employing MCM techniques, a resource element may consist of one symbol period (such as a duration of one modulation symbol) and one subcarrier, where the symbol period and subcarrier spacing are inversely related. The number of bits carried by each resource element may depend on the modulation scheme (such as the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (such as spatial layers), and the use of multiple spatial layers may further increase the data rate for communications with a UE 115.

Devices of the wireless communications system 100 (such as base stations 105 or UEs 115) may have a hardware configuration that supports communications over a particular carrier bandwidth or may be configurable to support communications over one of a set of carrier bandwidths. In some implementations, the wireless communications system 100 may include base stations 105 and UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some implementations, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some implementations, an eCC may be associated with a carrier aggregation configuration or a dual connectivity configuration (such as when multiple serving cells have a suboptimal or non-ideal backhaul link). An eCC also may be configured for use in unlicensed spectrum or shared spectrum (such as where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (such as to conserve power).

In some implementations, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (such as according to frequency channel or carrier bandwidths of 20, 40, 60, 80 MHz, etc.) at reduced symbol durations (such as 16.67 microseconds). A TTI in eCC may consist of one or multiple symbol periods. In some implementations, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some implementations, NR shared spectrum may increase spectrum utilization and spectral efficiency, specifically through dynamic vertical (such as across the frequency domain) and horizontal (such as across the time domain) sharing of resources.

In some implementations (such as in a contention-based system such as NR-U), devices may operate following an LBT procedure prior to communicating over a channel. For example, devices may communicate using a shared radio frequency spectrum band (such as an unlicensed radio frequency spectrum band) after a determination that the channel is clear and available for use. A wireless device that has data to transmit on the shared radio frequency spectrum band may first perform an LBT procedure, such as a CCA procedure, to determine whether other wireless devices are currently using (i.e., communicating over) the shared radio frequency spectrum band. If the shared radio frequency spectrum band is available, the wireless device may transmit after completing the LBT procedure. If unavailable, the wireless device may perform a subsequent LBT procedure at a later time before attempting to transmit on the shared radio frequency spectrum band. Such an LBT procedure may help devices avoid transmitting using the same resources or channels, which may otherwise result in collisions of transmissions.

In some implementations, a wireless node such as a base station 105 may perform an LBT procedure and obtain channel access for a COT. The wireless node may indicate to a UE 115 that it has acquired a channel for communications for the COT. The wireless node also may indicate information related to the COT, such as a length of time the wireless node holds the channel, resources for the UE 115 to utilize, etc.

In some implementations, the disclosure herein provides for triggering reference signals (such as an SRS) for one or more wireless devices. The SRSs may be used to improve channel estimation for uplink transmissions. For example, the UEs 115 may transmit an SRS to facilitate error correction and data transmission. In some implementations, the wireless communications system 100 may support periodic SRSs. For instance, the UEs 115 may be configured (such as by RRC signaling) to transmit an SRS following a periodic cycle. In some implementations, the wireless communications system 100 may utilize A-SRSs. For example, the UEs 115 may be configured to transmit an SRS based on receiving a trigger, such as an SRS request in received DCI. A-SRSs may allow for SRS transmissions that dynamically utilize a wireless node (such as a gNB) COT. That is, A-SRSs may enable the base station 105 to receive status updates from the UEs 115 when the wireless node has obtained a COT in a shared radio frequency spectrum band (such as an unlicensed radio frequency spectrum band).

In some implementations, A-SRSs may be triggered for a group of the UEs 115. For example, information transmitted via a GC-PDCCH may trigger one or more of the UEs 115 to transmit an SRS. The GC-PDCCH may include DCI and may be monitored by the group of UEs 115. The GC-PDCCH also may include SRS information such as a triggering field, a timing adjustment field, a starting offset control field, an LBT type field, or any combination thereof.

Figure 2:
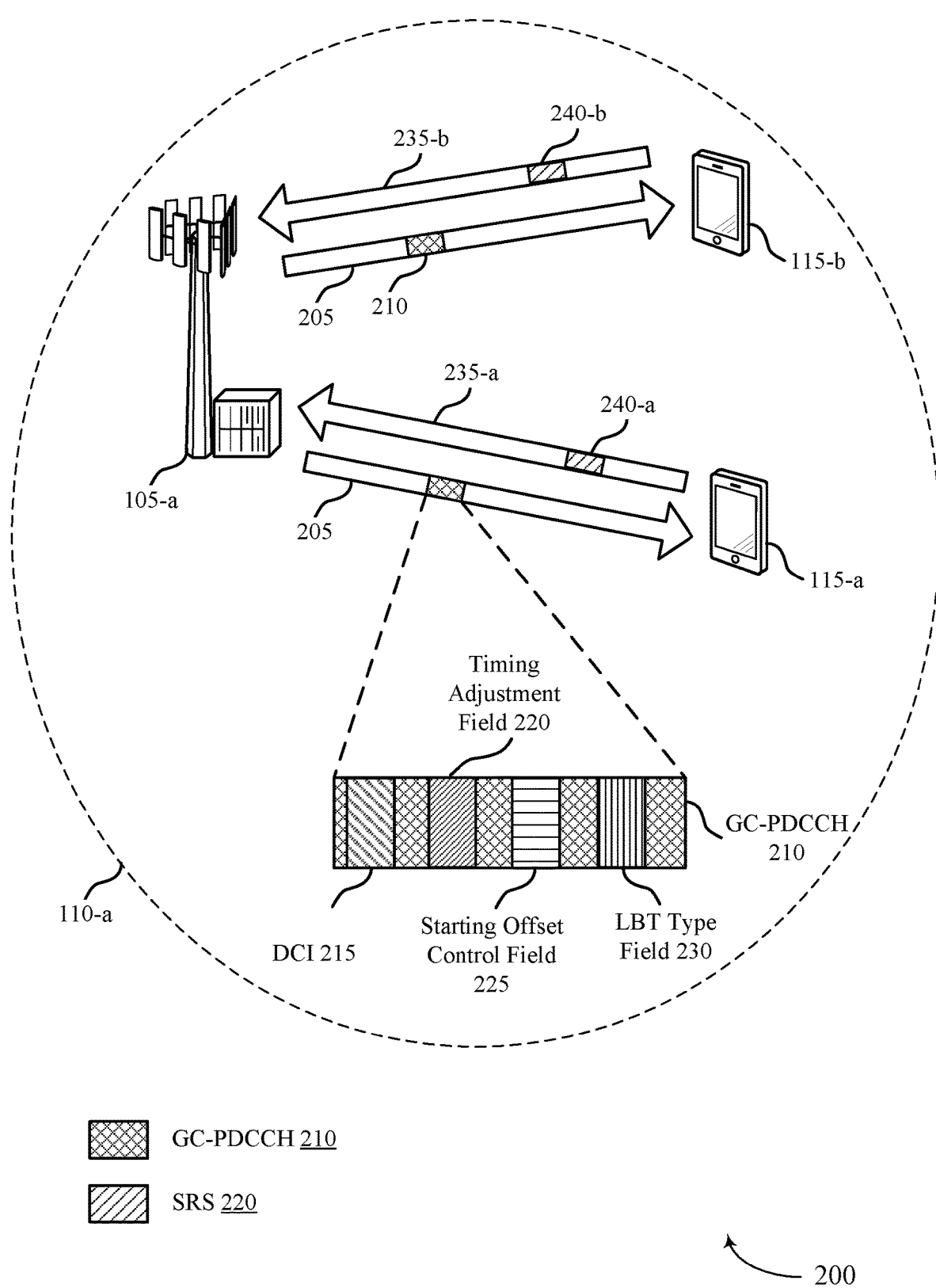

FIG. 2 shows an example of a wireless communications system 200 that supports group triggered reference signaling in contention-based systems. The wireless communications system 200 may include the base station 105-a and UEs 115-a and 115-b, which may be examples of a base station 105 and the UEs 115 as described with reference to FIG. 1. The base station 105-a may serve a geographic coverage area 110-a. In some implementations, the base station 105-a may implement a reference signal triggering procedure. For example, the base station 105-a may obtain a COT in a contention-based system and trigger SRSs from a group of the UEs 115. Additionally, or alternatively, other wireless devices may implement these triggering procedures.

In some implementations, the base station 105-a may send transmissions 205 to UE 115-a and UE 115-b. The transmissions 205 may include an SRS request and may trigger UEs 115 to transmit SRS transmissions 235. In some implementations, the SRS transmissions 225 may include an SRS 240 and may be triggered by a downlink or an uplink grant. For example, a downlink or uplink grant may include an SRS triggering field (such as a 2 bit SRS triggering field). The SRS triggering field may indicate to the UE 115-a to transmit the SRS 240-a. Additionally, or alternatively, the downlink or uplink grant may indicate a resource set the UE 115-a may use for transmitting the SRS 240-a.

In some other examples, the SRSs 240 may be triggered in a group fashion. For example, the base station 105-a may send a transmission 205 to a group of UEs 115 (such as the UE 115-a and the UE 115-b) via a GC-PDCCH 210. The GC-PDCCH 210 may be monitored and received by one or both of the UEs 115-a and 115-b. In some implementations, the GC-PDCCH 210 may include SRS information, such as timing information, resource information, etc.

For example, the GC-PDCCH 210 may include the DCI 215. In some wireless communications systems (such as NR-U), the base station 105-a may occupy a channel for a COT. That is, the base station 105-a may perform an LBT procedure and obtain a COT for communication with the UEs 115. In some implementations, the base station 105-a may transmit different DCI 215 for each of the UE 115-a and the UE 115-b. However, triggering each of the UEs 115 in this manner may be inefficient. For example, the base station 105-a may not have a sufficient control capacity, or the resources expended may be inefficient. Thus, the base station 105-a may transmit the DCI 215 via the GC-PDCCH 210 to trigger multiple UEs 115, such as both the UE 115-a and the UE 115-b, to transmit the SRSs 240-a and 240-b, respectively, in a relatively small time span (such as the same slot).

In some implementations, a DCI format for the DCI 215 may be selected to signal multiple UEs 115 to send a status update (such as the SRSs 240). For example, the UE 115-a and the UE 115-b may receive the DCI 215 in a given format, such as a DCI format 2_3 or another DCI format. The DCI 215 may be scrambled (such as through the use of a given temporary ID such as a TPC-SRS-RNTI) and may include configuration information (such as SRS information) for a group of UEs 115, such as the UE 115-*a* and the UE 115-*b*. The configuration information also may include TPC information, SRS parameters, a radio network temporary identifier (RNTI), and the like. Additionally, or alternatively, the UE 115-*a* and the UE 115-*b* may be configured or signaled the location of a resource block to monitor in the DCI 215 or the GC-PDCCH 210 to receive the configuration information (such as SRS information).

The DCI format also may be used for the transmission of a group of TPC commands to one or more of the UEs 115. The group of TPC commands may be used by the UEs 115 for SRS transmissions 240. In some implementations, an SRS request may be transmitted along with a TPC command. That is, in some implementations, the DCI 215 may provide the TPC command as well as triggering the SRS transmissions 240. In some implementations, the triggering mechanism is a triggering field (such as a 2 bit SRS triggering field).

In some implementations, the UE 115-*a* and the UE 115-*b* may be configured to monitor a resource (such as a resource block in GC-PDCCH 210) for the DCI 215 and receive a trigger (such as a triggering field) to transmit an SRS 240. In some implementations, the DCI 215 may include configuration information (such as TPC, SRS parameters, or an RNTI). In some other examples, the DCI 215 may include triggering information without TPC information. For example, TPC commands may be removed from a selected DCI format, or a receiving UE 115-*a* may be configured (in some implementations by an RRC configuration) to ignore a TPC command.

In some implementations, a group of UEs 115 may be configured to monitor the same resource to receive the DCI 215. For example, UE 115-*a* and UE 115-*b* may monitor the same resource block and also may receive different associated SRS resources. In some implementations, the base station 105-*a* may be configured to ensure each of the UE 115-*a* and the UE 115-*b* interprets information received on one resource differently. For example, the base station 105-*a* may configure (in some implementations by RRC signaling) the UE 115-*a* and the UE 115-*b* monitoring the same resource block to interpret a received triggering state differently (i.e., derive different parameters for transmitting the SRS 240-*a* and the SRS 240-*b*, respectively). The different interpretations may enable each UE 115-*a* and UE 115-*b* to send the SRS 240-*a* and the SRS 240-*b*, respectively, without interference with each other.

In some implementations, the base station 105-*a* may configure the UE 115-*a* and the UE 115-*b* with an RRC configuration. In some implementations, an RRC configuration may include information associated with SRSs 240. For example, the RRC configuration may configure resources to be utilized by an SRS 240 (such as an A-SRS resource set). The RRC configuration also may configure a slot offset. The RRC configured slot offset may be an offset between a triggering DCI (such as the DCI 215) and a corresponding SRS transmission (such as an SRS 240). For example, a slot offset of 32 slots may result in the UE 115-*b* transmitting the SRS 240-*b* 32 slots after the slot carrying the DCI 215, although the value of the slot offset may vary (such as from 1 and 32).

In some implementations, the slot offset configured by the RRC configuration may be static. The slot offset may be a fixed value such that when, as an example, the UE 115-*b* receives a trigger (such as an SRS request), the UE 115-*b* may transmit the SRS 240-*b* after the slot offset configured by the RRC configuration. Accordingly, a triggering DCI 215, in some implementations transmitted via the GC-PDCCH 210, may be transmitted at a fixed location (such as 32 slots prior to a transmitted SRS 240). Such a fixed timing offset may limit the scheduling flexibility of a wireless node. For example, in a wireless communications system utilizing an unlicensed spectrum, the base station 105-*a* may attempt to schedule a transmission 205 at the fixed location and may not have obtained a COT that includes the fixed location. That is, the base station 105-*a* may not have acquired access to a channel for communication with the UEs 115 in the fixed slot opportunity for transmission 205.

In some other examples, the GC-PDCCH 210 may include a timing adjustment field 220. Such a field may allow for more flexible scheduling of resources. For example, the timing adjustment field 220 may enable variable transmission timing (such as 6 slots earlier than the fixed slot offset configured by an RRC configuration) of a triggered SRS 240 with respect to transmission 205. The timing adjustment field 220 may be, in some implementations, utilized in addition to a value configured in an SRS-resource set (such as a fixed slot offset from an RRC configuration) to reduce the number of bits needed for signaling a timing adjustment.

The UEs 115 may be configured to monitor the GC-PDCCH 210. For example, the UE 115-*a* or the UE 115-*b* may be configured to monitor a resource for an SRS triggering field. Additionally, or alternatively, the UE 115-*a* or the UE 115-*b* may be configured to monitor a resource for the timing adjustment field 220. In some implementations, the timing adjustment field 220 may be applied when an SRS 240 is triggered (such as by the triggering field). In some other examples, the UE 115-*a* or the UE 115-*b* may be configured to monitor a resource for just the SRS triggering field. In such examples, a default timing (such as an RRC configured timing offset) may be utilized for transmitting an SRS 240. In some implementations, different groups of UEs 115 may be configured to monitor different resources (such as resource blocks including timing information) for different timing adjustment fields 220.

In some implementations, such as when SRSs 240 may be triggered in a UE specific manner via the DCI 215, the DCI 215 may include a starting offset. For instance, the starting offset may indicate to the UE 115-*a* an offset from the starting position (such as an RRC configured starting symbol) of an SRS transmission 235. The starting offset may be received in a downlink grant and may be utilized for a physical uplink control channel (PUCCH) transmission. Additionally, or alternatively, the starting offset field may be received in an uplink grant and utilized for a physical uplink shared channel (PUSCH) transmission.

In some other examples, SRSs 240 may be triggered in a group fashion (such as using a GC-PDCCH 210). In such examples, the triggered SRSs 240 from multiple UEs 115 may be started at the same time, in some implementations due to an RRC configuration. In order to enable dynamic control of the starting time, the GC-PDCCH 210 may include a starting offset control field 225. The starting offset control field 225 may control the starting position for an SRS transmission 235. For example, a starting offset value determined from the starting offset control field 225 may overwrite a configured starting offset value configured by RRC signaling. The determined starting offset value may be a value of a timing offset from a slot boundary (such as how many symbols or sub-symbols a transmission occurs from a slot boundary). In some implementations, the timing adjustment field 220 may adjust the transmission timing for an SRS transmission 235 at the slot level, and the starting offset control field 225 may adjust the transmission timing at the symbol level.

The starting offset value of the starting offset control field 225 may be selected from one or more candidate starting offset values. The candidate starting offset values may be configured by RRC signaling (such as an RRC configuration) and one of the values may be selected for use when an SRS 240 is triggered via the GC-PDCCH 210 (among other examples). Additionally, or alternatively, the candidate starting offset values may be configured in an SRS triggering configuration transmitted via the GC-PDCCH 210.

The UE 115-a may be configured to monitor a starting offset control field 225, for example, in a GC-PDCCH 210 carrying an SRS trigger. If the UE 115-a does not receive a new starting offset value from monitoring the starting offset field 225, the UE 115-a may use a configured starting offset for an SRS transmission. Alternatively, the UE 115-a may receive a new starting offset control field 225 and may utilize a new starting offset for an SRS transmission 235-a. The offset field value may be applied when the SRS 240-a is triggered. In some implementations, multiple UEs 115 may be configured to monitor the same starting offset control field 225. Additionally, or alternatively, different groups of UEs 115 may be configured to monitor different starting offset control fields 225 in the GC-PDCCH 210.

Wireless communications system 200 may operate following an LBT procedure. For example, a wireless node (such as the base station 105-a) may acquire a COT and schedule a UE 115-a to transmit an SRS 240-a. Before transmitting the SRS 240-a, the UE 115-a may perform an LBT procedure, such as a CCA procedure, before transmitting to determine whether any other wireless devices are currently transmitting in a shared radio frequency spectrum band. If the shared radio frequency spectrum band is available, the UE 115-a may transmit after completing the LBT procedure. If unavailable, the UE 115-a may perform a subsequent LBT procedure at a later time before attempting to transmit on the shared radio frequency spectrum band.

In some implementations, the UE 115-a may perform an LBT procedure based on an LBT type. For example, the UE 115-a may have an LBT category (CAT) 2 and may perform a one-shot CCA procedure. Additionally, or alternatively, the UE 115-a may have an LBT type of CAT 4 and may perform a full CCA procedure (such as performing a CCA procedure multiple times before transmitting). The UE 115-a also may have any other LBT type, such as CAT 1.

In some implementations, the UE 115-a may determine an appropriate LBT type based on an acquired COT. For example, the UE 115-a may detect that a scheduled SRS transmission 235-a occurs inside the COT and may determine an LBT category to follow before transmitting. The UE 115-a may select, as an example, an LBT CAT such as CAT 2, and the UE 115-a may transmit the SRS transmission 235-a after performing a single CCA procedure. In some other examples, the UE 115-a may detect that a scheduled SRS transmission 235-a occurs outside the COT. For example, a triggered SRS 240-a may be transmitted 32 slots later than the received trigger (such as in the DCI 215), and the UE 115-a may detect that the designated slot for transmission is located outside the COT. The UE 115-a may determine an appropriate LBT category based on the detection. The UE 115-a may select, as an example, an LBT category such as CAT 4 and perform multiple CCA procedures before transmitting the SRS transmission 235-a.

Additionally, or alternatively, the GC-PDCCH 210 may include an LBT type field 230. The LBT type field may indicate an explicit LBT type (such as an LBT CAT) for one or more UEs 115 to use. In some implementations, the LBT type field 230 may be used in addition to or alternative to relying on COT detection for determining an LBT type.

Figure 3:
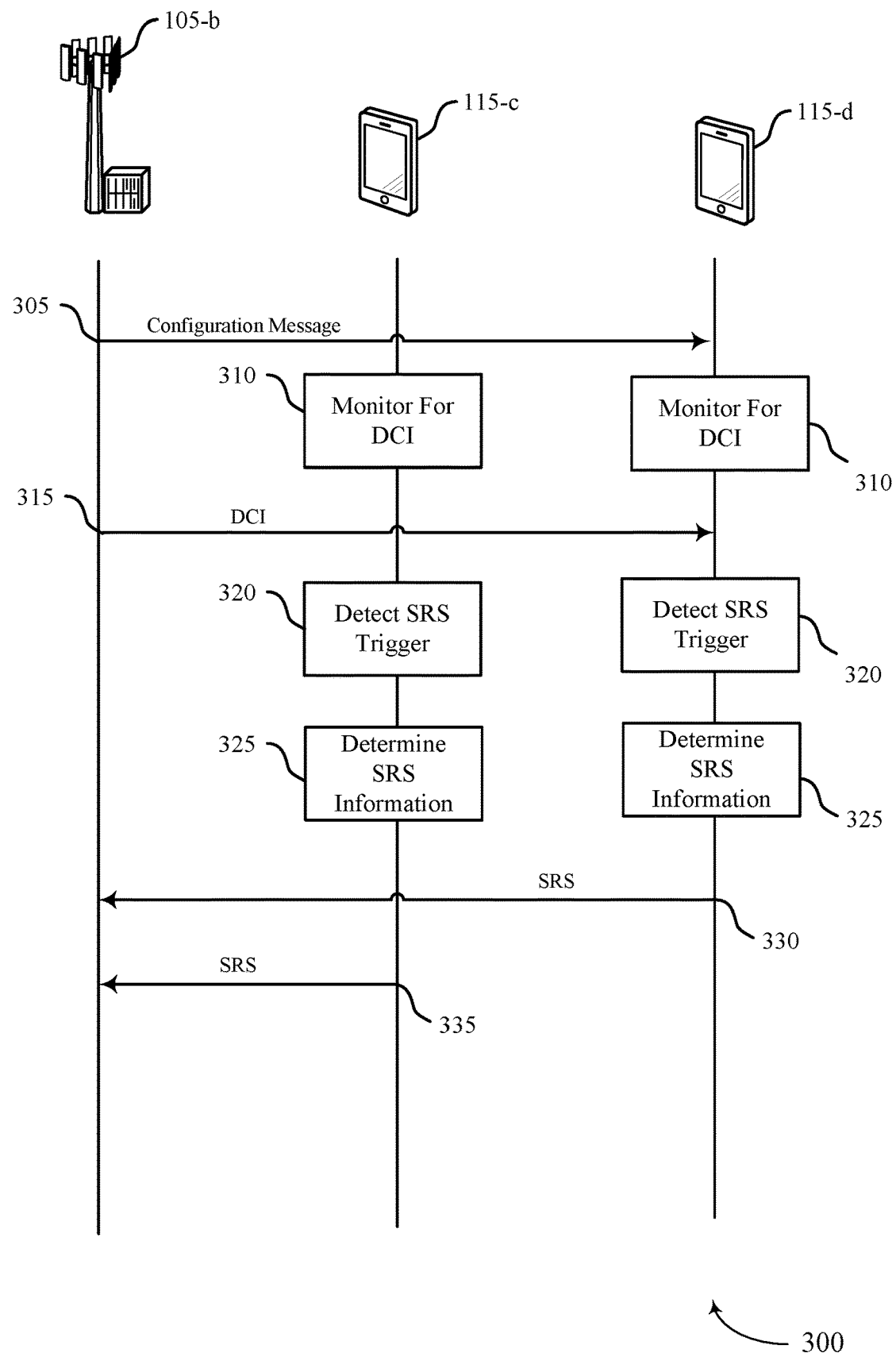
FIG. 3 shows an example of a process flow for triggered sounding reference signal (SRS) transmissions.

FIG. 3 shows an example of a process flow for triggered SRS transmissions. The process flow 300 may illustrate example communications for reference signaling. For example, a base station 105-b may communicate with a UE 115-c and a UE 115-d. The base station 105-b and the UEs 115-c and 115-d may be examples of the corresponding wireless devices described with reference to FIGS. 1 and 2. Alternative examples of the following may be implemented, where some steps are performed in a different order than described or are not performed at all. In some implementations, steps may include additional features not mentioned below, or further steps may be added.

At 305, the base station 105-b may transmit, to the UE 115-c and the UE 115-d, a configuration message. The configuration message may be an example of an RRC configuration. The RRC configuration may include information associated with SRSs. For example, the RRC configuration may configure SRS resources (such as an A-SRS resource set) for the UE 115-c or the UE 115-d to utilize for sending SRSs. The RRC configuration also may configure timing information, such as a slot offset. The slot offset may be an offset between a triggering DCI and a corresponding SRS transmission (such as a number of slots between the two communications).

At 310, the UE 115-c and the UE 115-d may monitor a resource for DCI. The UE 115-c and the UE 115-d may be configured to monitor the same resource to receive the DCI. For example, both the UE 115-c and the UE 115-d may monitor the same resource block and also may receive different associated SRS resources. In some implementations, the base station 105-b may be configured to ensure each of the UE 115-c and the UE 115-d interprets information received on the resource differently. For example, the base station 105-b may configure (in some implementations by RRC signaling at stage 305) each of the UE 115-c and the UE 115-d, monitoring the same resource, to interpret a received triggering state differently (i.e., derive different parameters for transmitting an SRS). The different interpretations may enable the UE 115-c and UE 115-d to send an SRS without interference with one each other.

At 315, the base station 105-b may transmit DCI via a GC-PDCCH. The GC-PDCCH and the DCI may be examples of a GC-PDCCH 210 and a DCI 215 described herein with reference to FIG. 2. The GC-PDCCH or the DCI may include SRS information, such as configuration information, a DCI format, a timing adjustment field, a starting offset control field, an LBT type field, and the like.

At 320, the UE 115-c and the UE 115-d may receive the DCI 315 and may detect an SRS request or an SRS trigger, such as a 2-bit SRS trigger field. The UE 115-c and the UE 115-d may determine to prepare an SRS transmission based on the detecting. In some implementations, the trigger field was detected in the same resource of a GC-PDCCH for both the UE 115-c and the UE 115-d.

At 325, the UE 115-c and the UE 115-d may determine SRS information. For example, the UE 115-c and the UE 115-d may determine configuration information, timing information, or other SRS information from the configuration message, the DCI, the GC-PDCCH, or any combination thereof. As an example, the UE 115-c and the UE 115-d may determine a timing adjustment, starting offset, LBT type, an SRS resource set (such as time-frequency resources of a shared radio frequency band for transmission of the SRS), or any other information to be used for a reference signal transmission (such as a power control command, as one example). In some implementations, the determined information for each of the UE 115-c and the UE 115-d may be different, in some implementations due to monitoring different resources for different information, and in some other implementations due to being configured to interpret a trigger state at the same resource differently, or a combination of both implementations.

At 330, the UE 115-d may transmit an SRS transmission. The SRS transmission may include one or more SRSs. The SRS transmission may be transmitted via determined resources according to the determined timing information. In some implementations, the SRS transmission may be performed following an LBT procedure (such as a CCA procedure performed according to a determined LBT type).

At 335, the UE 115-c also may transmit an SRS transmission including one or more SRSs. In some implementations, due to differently interpreted or received SRS information (such as timing information), the UE 115-c may transmit the SRS transmission on different resources or timing than the UE 115-d. Alternatively, the UE 115-c may transmit the SRS transmission with the same resources or the same timing as the UE 115-d.

Figure 4:
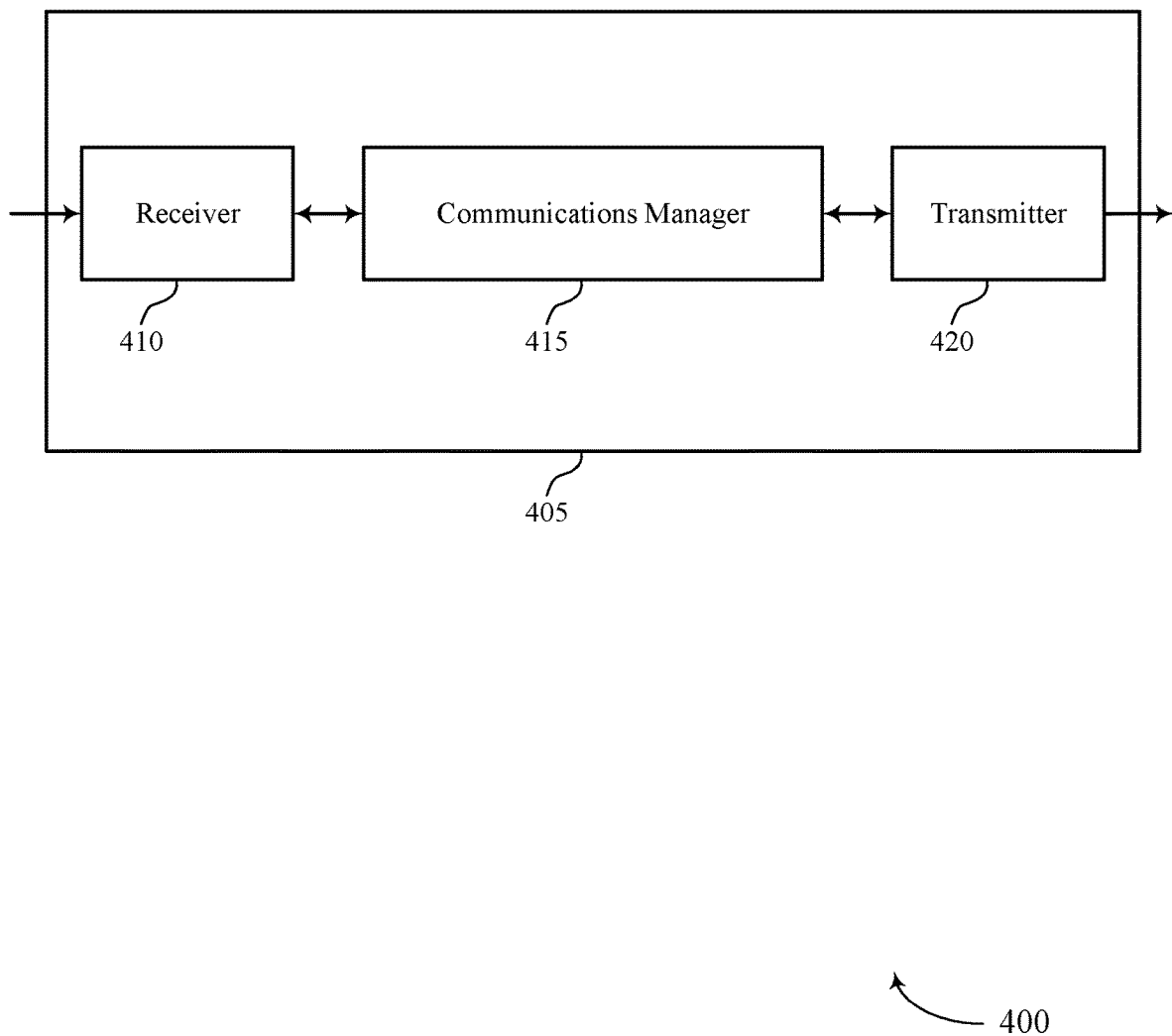
FIGS. 4 and 5 show block diagrams of example devices for triggered SRS transmissions.

FIG. 4 shows a block diagram 400 of an example device 405 for triggered SRS transmissions. The device 405 may be an example of aspects of a UE 115 as described herein. The device 405 may include a receiver 410, a communications manager 415, and a transmitter 420. The device 405 also may include a processor. Each of these components may be in communication with one another (such as via one or more buses).

The receiver 410 may receive information such as packets, user data, or control information associated with various information channels (such as control channels, data channels, and information related to group reference signal triggering for contention-based systems, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive, from a base station over a shared radio frequency band, a group common control channel configured to trigger transmission of a reference signal from a set of UEs including the UE, the group common control channel indicating timing information for transmission of the reference signal, determine a set of time-frequency resources of the shared radio frequency band for transmission of the reference signal based on the timing information, and transmit the reference signal to the base station via the set of time-frequency resources according to the timing information. The communications manager 415 may be an example of aspects of the communications manager 710 described herein.

The communications manager 415, or its sub-components, may be physically located at various positions, including being distributed such that portions of functions are implemented at different physical locations by one or more physical components. In some implementations, the communications manager 415, or its sub-components, may be a separate and distinct component. In some implementations, the communications manager 415, or its sub-components, may be combined with one or more other hardware components, including but not limited to an input/output (I/O) component, a transceiver, a network server, another computing device, one or more other components described in the present disclosure, or a combination thereof.

The transmitter 420 may transmit signals generated by other components of the device 405. In some implementations, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
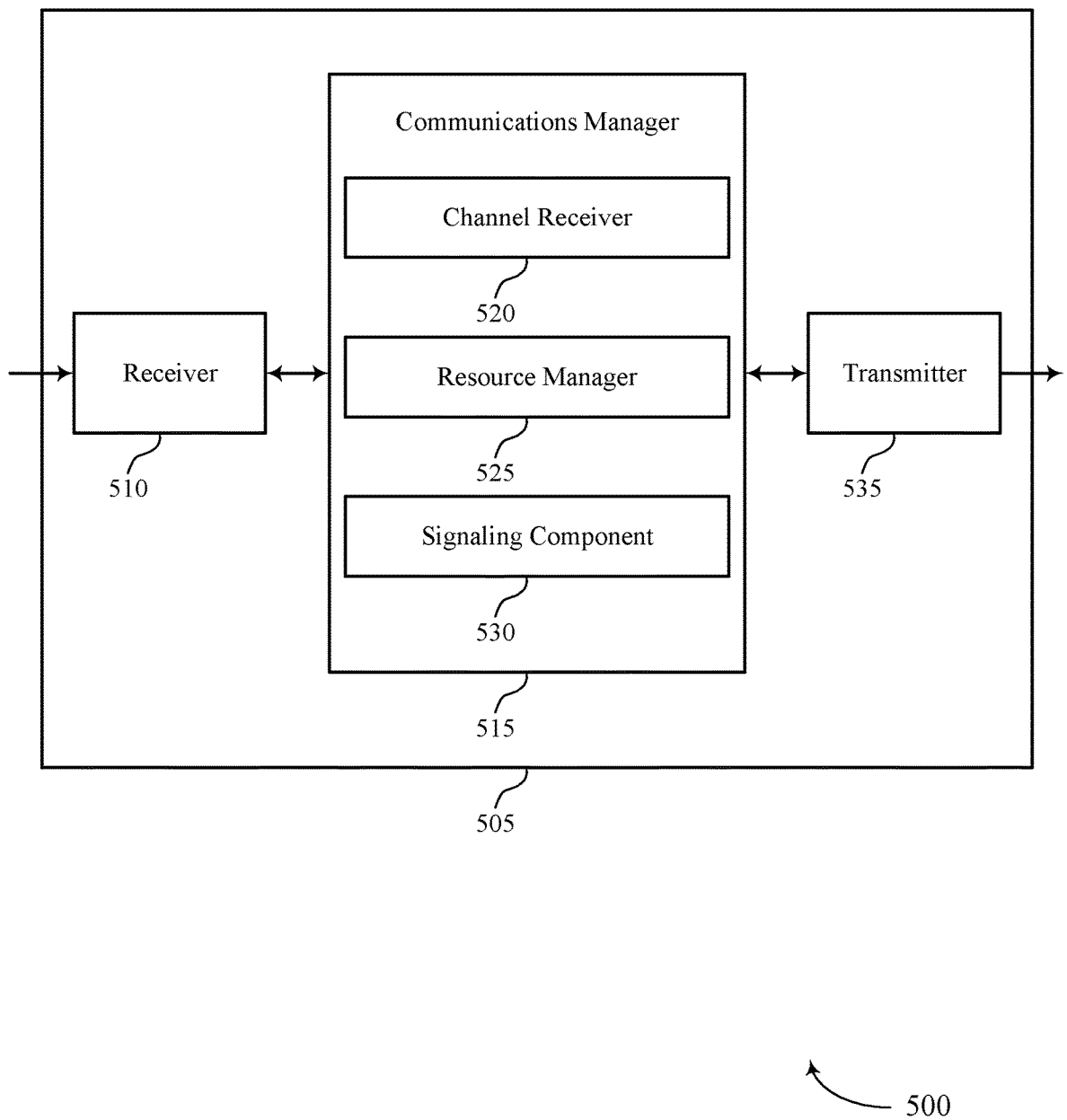

FIG. 5 shows a block diagram 500 of an example device 505 for triggered SRS transmissions. The device 505 may be an example of aspects of a device 405, or a UE 115 as described herein. The device 505 may include a receiver 510, a communications manager 515, and a transmitter 535. The device 505 also may include a processor. Each of these components may be in communication with one another (such as via one or more buses).

The receiver 510 may receive information such as packets, user data, or control information associated with various information channels (such as control channels, data channels, and information related to group reference signal triggering for contention-based systems, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a channel receiver 520, a resource manager 525, and a signaling component 530. The communications manager 515 may be an example of aspects of the communications manager 710 described herein.

The actions performed by the communications manager 515 as described herein may be implemented to realize one or more potential advantages. One implementation may enable a wireless device, such as a wireless node, to transmit information via a GC-PDCCH to trigger transmissions of reference signals from UEs in a group of UEs. Such information may enable UEs to coordinate transmissions according to available time-frequency resources, which may result in higher data rates and more efficient communications with fewer communication errors, among other advantages.

Based on implementing the group transmissions as described herein, a processor of a wireless node, such as a processor controlling the receiver 510, the communications manager 515, the transmitter 520, or a combination thereof, may reduce the impact or likelihood of collisions of transmissions in a communications system while ensuring relatively efficient communications. For example, techniques leveraging the GC-PDCCH to trigger reference signals from a group of UEs as described herein may effectively utilize resources, control capability, and processing power at the wireless node, which may realize reduced signaling overhead and power savings, among other benefits.

The channel receiver 520 may receive, from a base station over a shared radio frequency band, a group common control channel configured to trigger transmission of a reference signal from a set of UEs including the UE, the group common control channel indicating timing information for transmission of the reference signal.

The resource manager 525 may determine a set of time-frequency resources of the shared radio frequency band for transmission of the reference signal based on the timing information.

The signaling component 530 may transmit the reference signal to the base station via the set of time-frequency resources according to the timing information.

The transmitter 535 may transmit signals generated by other components of the device 505. In some implementations, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
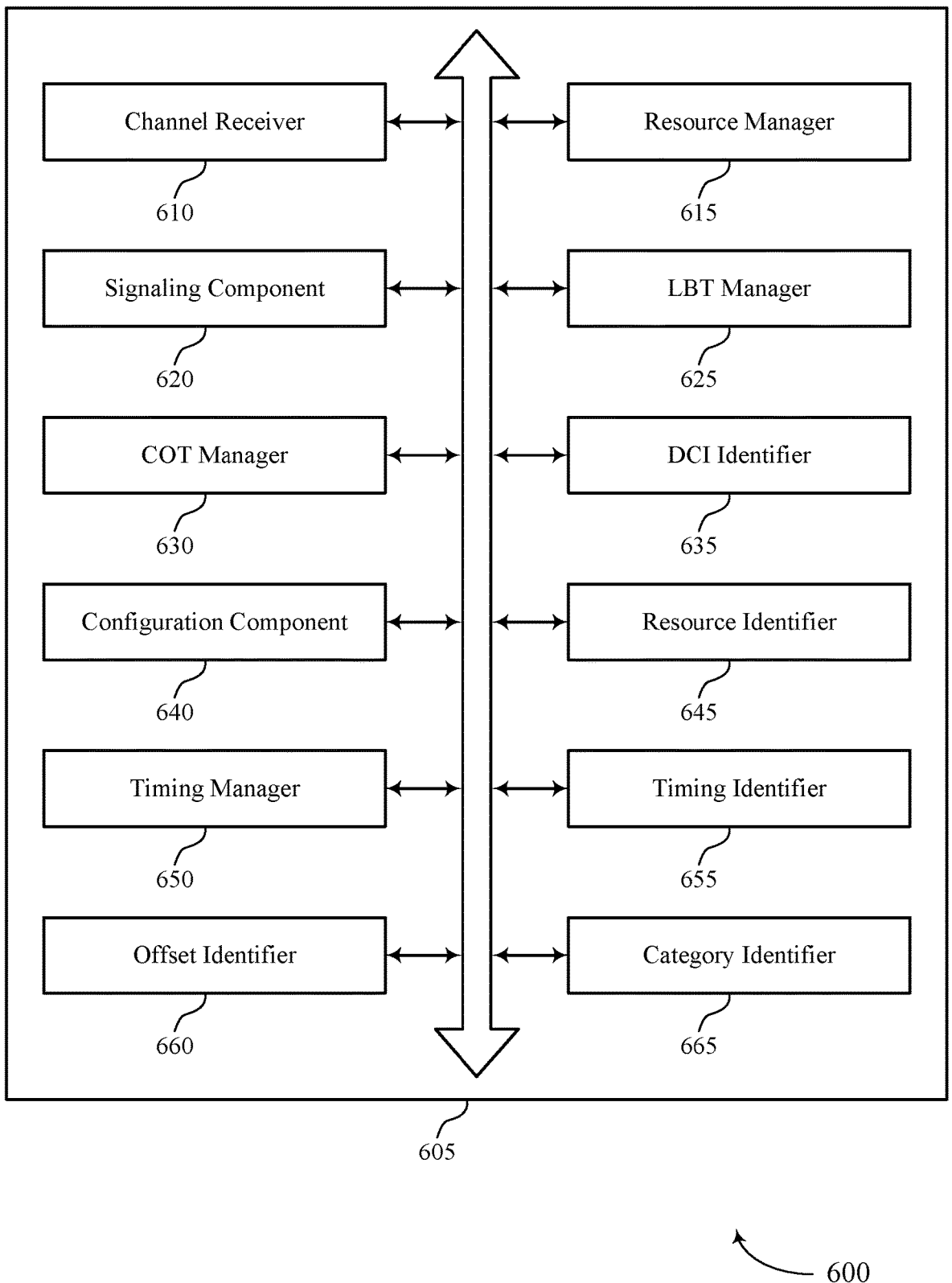
FIG. 6 shows a block diagram of an example communications manager that supports group reference signal triggering for contention-based systems.

FIG. 6 shows a block diagram 600 of an example communications manager 605 that supports group reference signal triggering for contention-based systems. The communications manager 605 may be an example of aspects of a communications manager 415, a communications manager 515, or a communications manager 710 described herein. The communications manager 605 may include a channel receiver 610, a resource manager 615, a signaling component 620, an LBT manager 625, a COT manager 630, a DCI identifier 635, a configuration component 640, a resource identifier 645, a timing manager 650, a timing identifier 655, an offset identifier 660, and a category identifier 665. Each of these modules may communicate, directly or indirectly, with one another (such as via one or more buses).

The channel receiver 610 may receive, from a base station over a shared radio frequency band, a group common control channel configured to trigger transmission of a reference signal from a set of UEs including the UE, the group common control channel indicating timing information for transmission of the reference signal.

The resource manager 615 may determine a set of time-frequency resources of the shared radio frequency band for transmission of the reference signal based on the timing information.

The signaling component 620 may transmit the reference signal to the base station via the set of time-frequency resources according to the timing information. In some implementations, the signaling component 620 may transmit the reference signal over a channel of the shared radio frequency band based on a successful LBT procedure. In some implementations, the signaling component 620 may transmit the reference signal based on the offset adjustment. In some implementations, the signaling component 620 may transmit the reference signal based on the starting offset. In some implementations, the reference signal includes an SRS.

The LBT manager 625 may perform an LBT procedure to access the shared radio frequency band. In some implementations, the LBT manager 625 may perform an LBT procedure corresponding to the LBT category to access the shared radio frequency band.

The COT manager 630 may determine time resources of the set of time-frequency resources for transmission of the reference signal based on a COT of the base station, where the time resources are within an interval associated with the COT.

The DCI identifier 635 may identify DCI in the group common control channel, where a format of the DCI excludes a power control command. In some implementations, the DCI identifier 635 may identify DCI in the group common control channel, where a format of the DCI includes a power control command.

The configuration component 640 may receive an RRC configuration from the base station, where the RRC configuration includes an indication to ignore the power control command.

The resource identifier 645 may identify a respective set of time-frequency resources for a group of UEs including the UE based on an indication within the group common control channel.

The timing manager 650 may receive an RRC transmission time interval offset for transmission of the reference signal via RRC signaling.

The timing identifier 655 may identify a timing adjustment field from the timing information in the group common control channel, the timing adjustment field indicating an offset adjustment relative to the RRC transmission time interval offset for transmission of the reference signal. In some implementations, the timing adjustment field is configured for a group of UEs including the UE.

The offset identifier 660 may identify a starting offset for transmission of the reference signal from the timing information of the group common control channel, the starting offset indicating a start time of a transmission time interval for transmission of the reference signal. In some implementations, the starting offset is configured for multiple UEs of the set of UEs. In some implementations, the starting offset is configured for a group of UEs including the UE.

The category identifier 665 may identify an LBT category for transmission of the reference signal based on an indication within the group common control channel.

Figure 7:
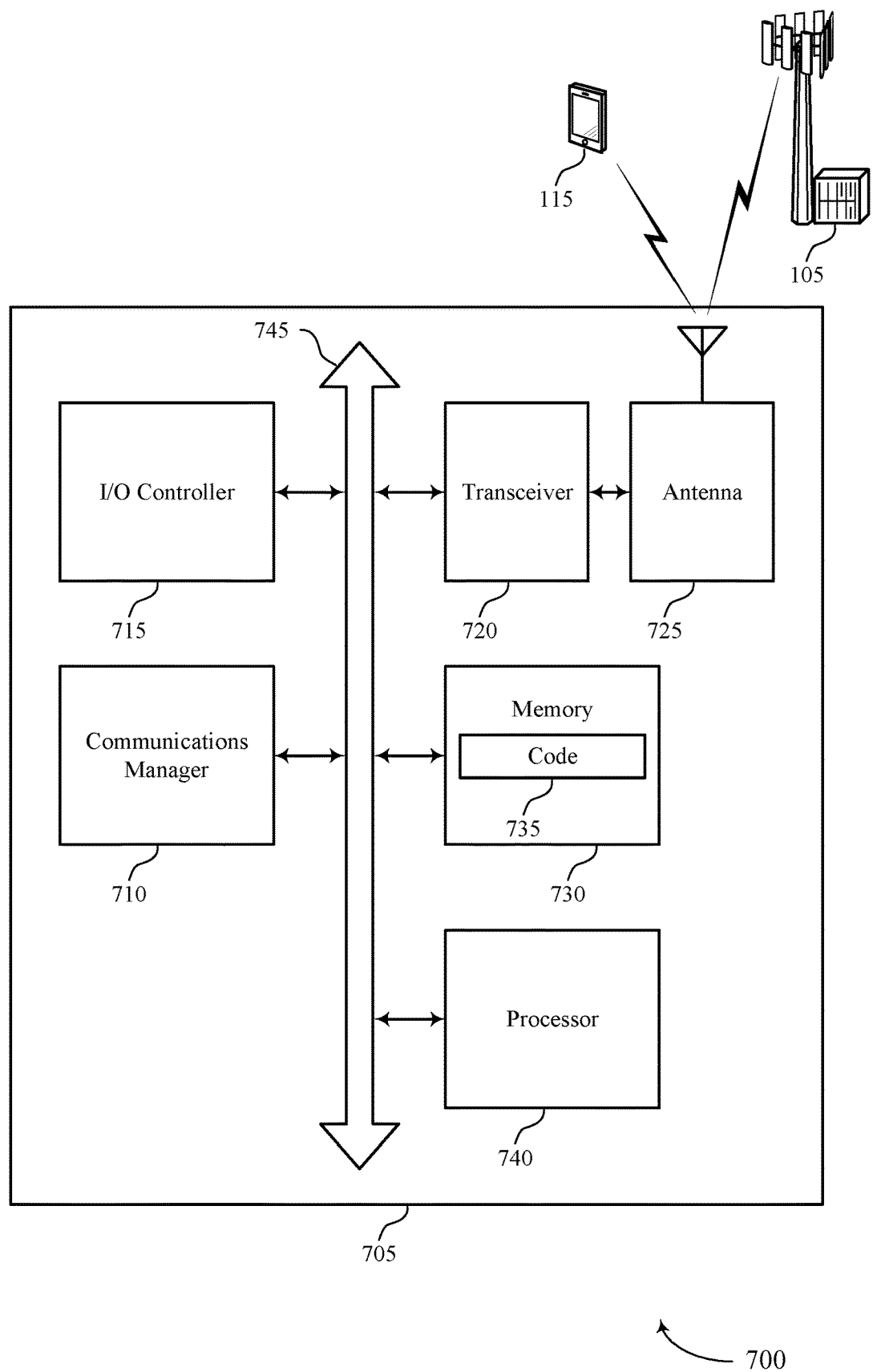
FIG. 7 shows a diagram of an example system including a device that supports group reference signal triggering for contention-based systems.

FIG. 7 shows a diagram 700 of an example system including a device 705 that supports group reference signal triggering for contention-based systems. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (such as bus 745).

The communications manager 710 may receive, from a base station over a shared radio frequency band, a group common control channel configured to trigger transmission of a reference signal from a set of UEs including the UE, the group common control channel indicating timing information for transmission of the reference signal, determine a set of time-frequency resources of the shared radio frequency band for transmission of the reference signal based on the timing information, and transmit the reference signal to the base station via the set of time-frequency resources according to the timing information.

The I/O controller 715 may manage input and output signals for the device 705. The I/O controller 715 also may manage peripherals not integrated into the device 705. In some implementations, the I/O controller 715 may represent a physical connection or port to an external peripheral. In some implementations, the I/O controller 715 may utilize an operating system such as iOS®, ANDROID®, MS-DOS®, MS-WINDOWS®, OS/2®, UNIX®, LINUX®, or another known operating system. In some other implementations, the I/O controller 715 may represent or interact with a modem, a keyboard, a mouse, a touchscreen, or a similar device. In some implementations, the I/O controller 715 may be implemented as part of a processor. In some implementations, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 also may include a modem to modulate the packets and provide the modulated packets to the antennas for transmission, and to demodulate packets received from the antennas.

In some implementations, the device 705 may include a single antenna 725, or in some implementations, device 705 may have more than one antenna 725, which may be capable of concurrently transmitting or receiving multiple wireless transmissions.

The memory 730 may include random-access memory (RAM) and read-only memory (ROM). In some implementations, the memory 730 may contain, among other things, a BIOS which may control basic hardware or software operation such as the interaction with peripheral components or devices. The processor 740 may include an intelligent hardware device, (such as a general-purpose processor, a DSP, a central processing unit (CPU), a microcontroller, an ASIC, an FPGA, a programmable logic device, a discrete gate or transistor logic component, a discrete hardware component, or any combination thereof). In some implementations, the processor 740 may be configured to operate a memory array using a memory controller. In some other implementations, a memory controller may be integrated into the processor 740.

The processor 740 of the device 705 may interface with other components of the device 705, and may process information received from other components (such as inputs or signals), output information to other components, etc. For example, a chip or modem of the device 705 may include a processing system, a first interface to receive information, and a second interface to transmit information. In some implementations, the first interface may refer to an interface between the processing system of the chip or modem and the transceiver 720, such that the device 705 may receive information or signal inputs, and the information may be passed to the processing system. In some implementations, the second interface may refer to an interface between the processing system of the chip or modem and the transceiver 720, may transmit information output from the chip or modem.

The code 735 may include instructions to implement aspects of the present disclosure, including instructions to support wireless communications. The code 735 may be stored in a non-transitory computer-readable medium such as system memory or other type of memory. In some implementations, the code 735 may not be directly executable by the processor 740 but may cause a computer (such as when compiled and executed) to perform functions described herein.

Figure 8:
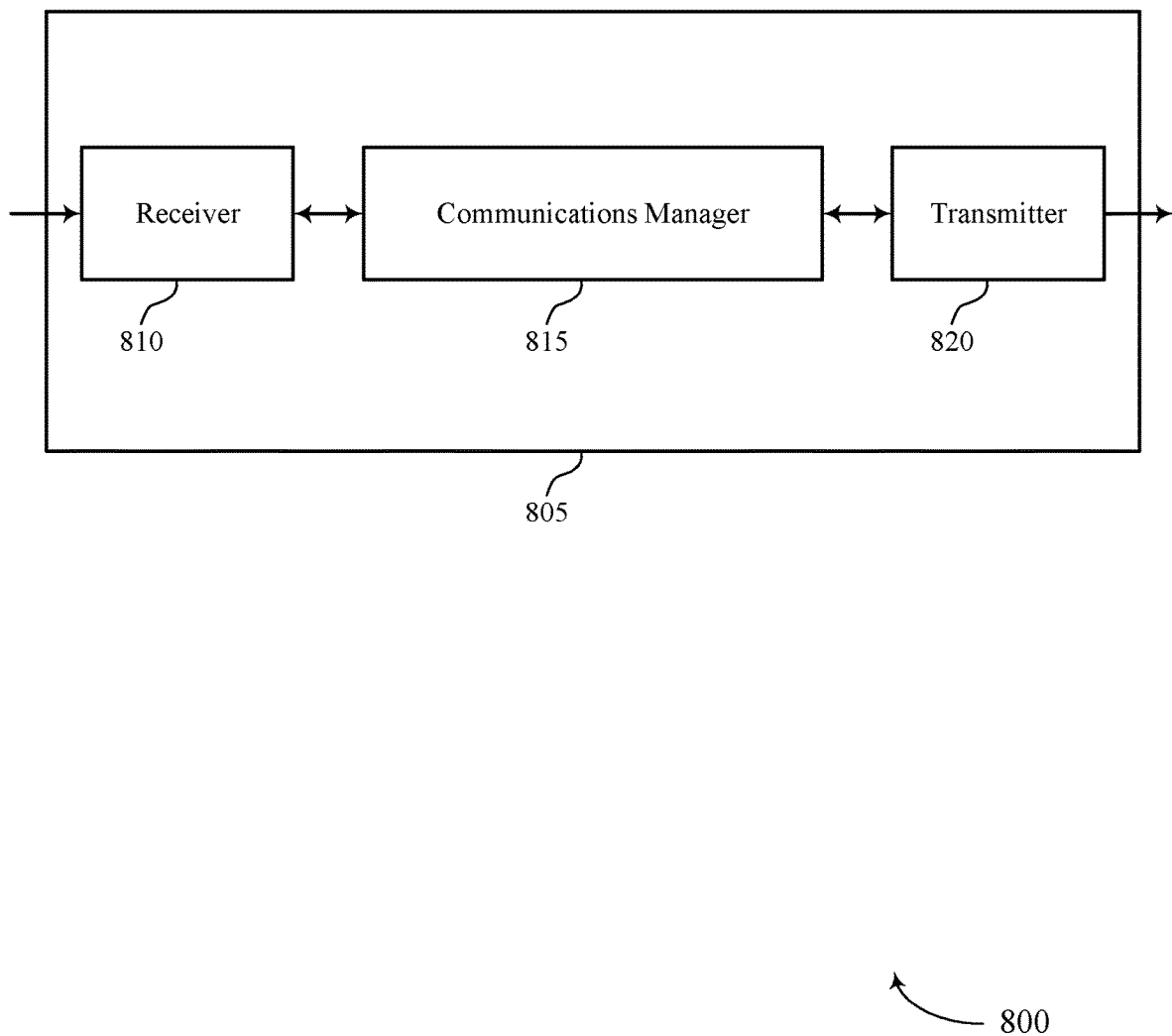
FIGS. 8 and 9 show block diagrams of example devices that support group reference signal triggering for contention-based systems.

FIG. 8 shows a block diagram 800 of an example device 805 that supports group reference signal triggering for contention-based systems. The device 805 may be an example of aspects of a base station 105 as described herein. The device 805 may include a receiver 810, a communications manager 815, and a transmitter 820. The device 805 also may include a processor. Each of these components may be in communication with one another (such as via one or more buses).

The receiver 810 may receive information such as packets, user data, or control information associated with various information channels (such as control channels, data channels, and information related to group reference signal triggering for contention-based systems, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a set of time-frequency resources of a shared radio frequency band for transmission of respective reference signals from each UE of a set of UEs, transmit a group common control channel configured to trigger transmission of a reference signal from a UE of the set of UEs, the group common control channel indicating timing information corresponding to the set of time-frequency resources for transmission of the respective reference signals, and monitor for at least one of the respective reference signals based on the timing information and the set of time-frequency resources. The communications manager 815 may be an example of aspects of the communications manager 1110 described herein.

The communications manager 815, or its sub-components, may be physically located at various positions, including being distributed such that portions of functions are implemented at different physical locations by one or more physical components. In some implementations, the communications manager 815, or its sub-components, may be a separate and distinct component. In some implementations, the communications manager 815, or its sub-components, may be combined with one or more other hardware components, including but not limited to an I/O component, a transceiver, a network server, another computing device, one or more other components described in the present disclosure, or a combination thereof.

The transmitter 820 may transmit signals generated by other components of the device 805. In some implementations, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
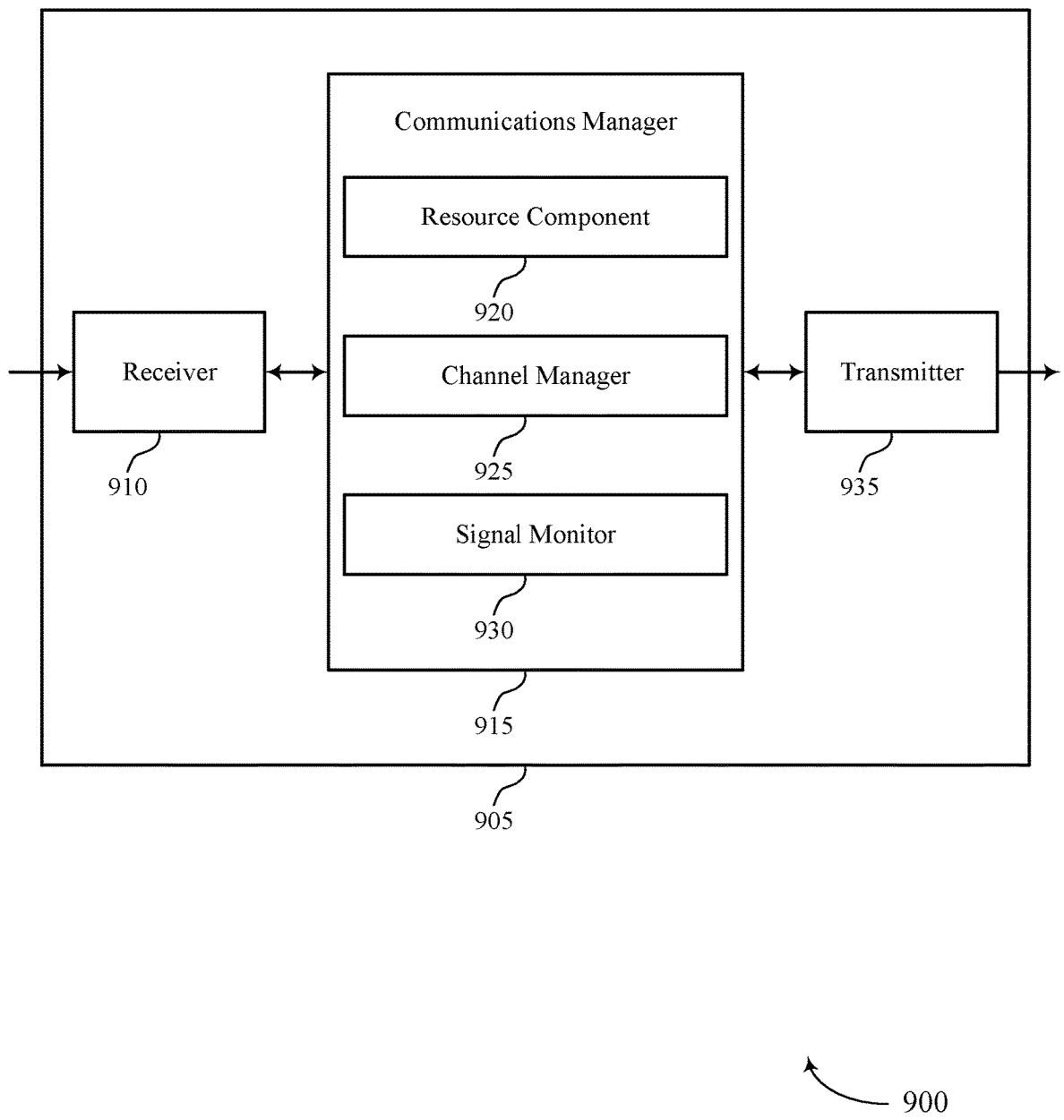

FIG. 9 shows a block diagram 900 of an example device 905 that supports group reference signal triggering for contention-based systems. The device 905 may be an example of aspects of a device 805, or a base station 105 as described herein. The device 905 may include a receiver 910, a communications manager 915, and a transmitter 935. The device 905 also may include a processor. Each of these components may be in communication with one another (such as via one or more buses).

The receiver 910 may receive information such as packets, user data, or control information associated with various information channels (such as control channels, data channels, and information related to group reference signal triggering for contention-based systems, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a resource component 920, a channel manager 925, and a signal monitor 930. The communications manager 915 may be an example of aspects of the communications manager 1110 described herein.

The resource component 920 may identify a set of time-frequency resources of a shared radio frequency band for transmission of respective reference signals from each UE of a set of UEs.

The channel manager 925 may transmit a group common control channel configured to trigger transmission of a reference signal from a UE of the set of UEs, the group common control channel indicating timing information corresponding to the set of time-frequency resources for transmission of the respective reference signals.

The signal monitor 930 may monitor for at least one of the respective reference signals based on the timing information and the set of time-frequency resources.

The transmitter 935 may transmit signals generated by other components of the device 905. In some implementations, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
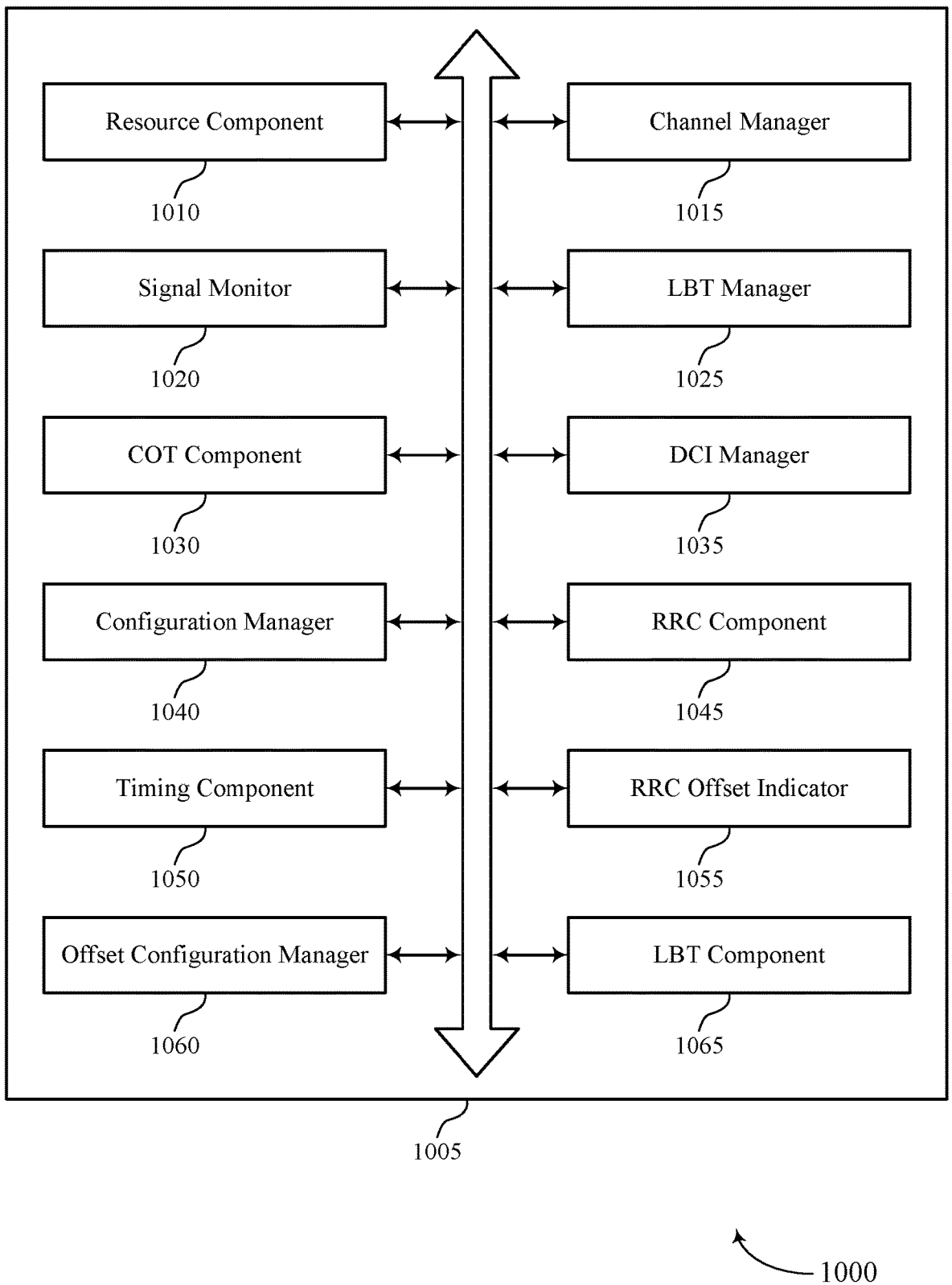
FIG. 10 shows a block diagram of an example communications manager that supports group reference signal triggering for contention-based systems.

FIG. 10 shows a block diagram 1000 of an example communications manager 1005 that supports group reference signal triggering for contention-based systems. The communications manager 1005 may be an example of aspects of a communications manager 815, a communications manager 915, or a communications manager 1110 described herein. The communications manager 1005 may include a resource component 1010, a channel manager 1015, a signal monitor 1020, an LBT manager 1025, a COT component 1030, a DCI manager 1035, a configuration manager 1040, an RRC component 1045, a timing component 1050, an RRC offset indicator 1055, an offset configuration manager 1060, and an LBT component 1065. Each of these modules may communicate, directly or indirectly, with one another (such as via one or more buses).

The resource component 1010 may identify a set of time-frequency resources of a shared radio frequency band for transmission of respective reference signals from each UE of a set of UEs. In some implementations, the resource component 1010 may identify the set of time-frequency resources based on the COT. In some implementations, the resource component 1010 may determine time resources of the set of time-frequency resources based on the COT, where the time resources are within an interval associated with the COT. In some implementations, the resource component 1010 may determine respective sets of time-frequency resources for respective UEs of the set of UEs, where the group common control channel includes an indication of the respective sets of time-frequency resources.

The channel manager 1015 may transmit a group common control channel configured to trigger transmission of a reference signal from a UE of the set of UEs, the group common control channel indicating timing information corresponding to the set of time-frequency resources for transmission of the respective reference signals.

The signal monitor 1020 may monitor for at least one of the respective reference signals based on the timing information and the set of time-frequency resources. In some implementations, the reference signal includes an SRS.

The LBT manager 1025 may perform an LBT procedure to access the shared radio frequency band.

The COT component 1030 may gain access to the shared radio frequency band for a COT based on a successful LBT procedure.

The DCI manager 1035 may include DCI in the group common control channel, where a format of the DCI excludes a power control command. In some implementations, the DCI manager 1035 may include DCI in the group common control channel, where a format of the DCI includes a power control command.

The configuration manager 1040 may transmit an RRC configuration to the UE, where the RRC configuration includes an indication to ignore the power control command.

The RRC component 1045 may configure an RRC transmission time interval offset for transmission of the reference signal.

The timing component 1050 may include a timing adjustment field in the group common control channel, the timing adjustment field indicating an offset adjustment relative to the RRC transmission time interval offset for transmission of the reference signal, where the timing information indicates the timing adjustment field. In some implementations, the timing component 1050 may configure respective timing adjustment fields for respective groups of UEs of the set of UEs, where the respective timing adjustment fields are included in the timing information of the group common control channel.

The RRC offset indicator 1055 may transmit an indication of the configured RRC transmission time interval offset via RRC signaling.

The offset configuration manager 1060 may configure a starting offset for transmission of the reference signal, the starting offset indicating a start time of a transmission time interval for transmission of the reference signal. In some implementations, the offset configuration manager 1060 may include an indication of the starting offset in the group common control channel, where the timing information indicates the starting offset. In some implementations, the offset configuration manager 1060 may configure respective starting offsets for respective groups of UEs of the set of UEs, where the respective starting offsets are included in the timing information of the group common control channel. In some implementations, the starting offset is configured for multiple UEs of the set of UEs.

The LBT component 1065 may identify an LBT category for transmission of the reference signal. In some implementations, the LBT component 1065 may include an indication of the LBT category in the group common control channel.

Figure 11:
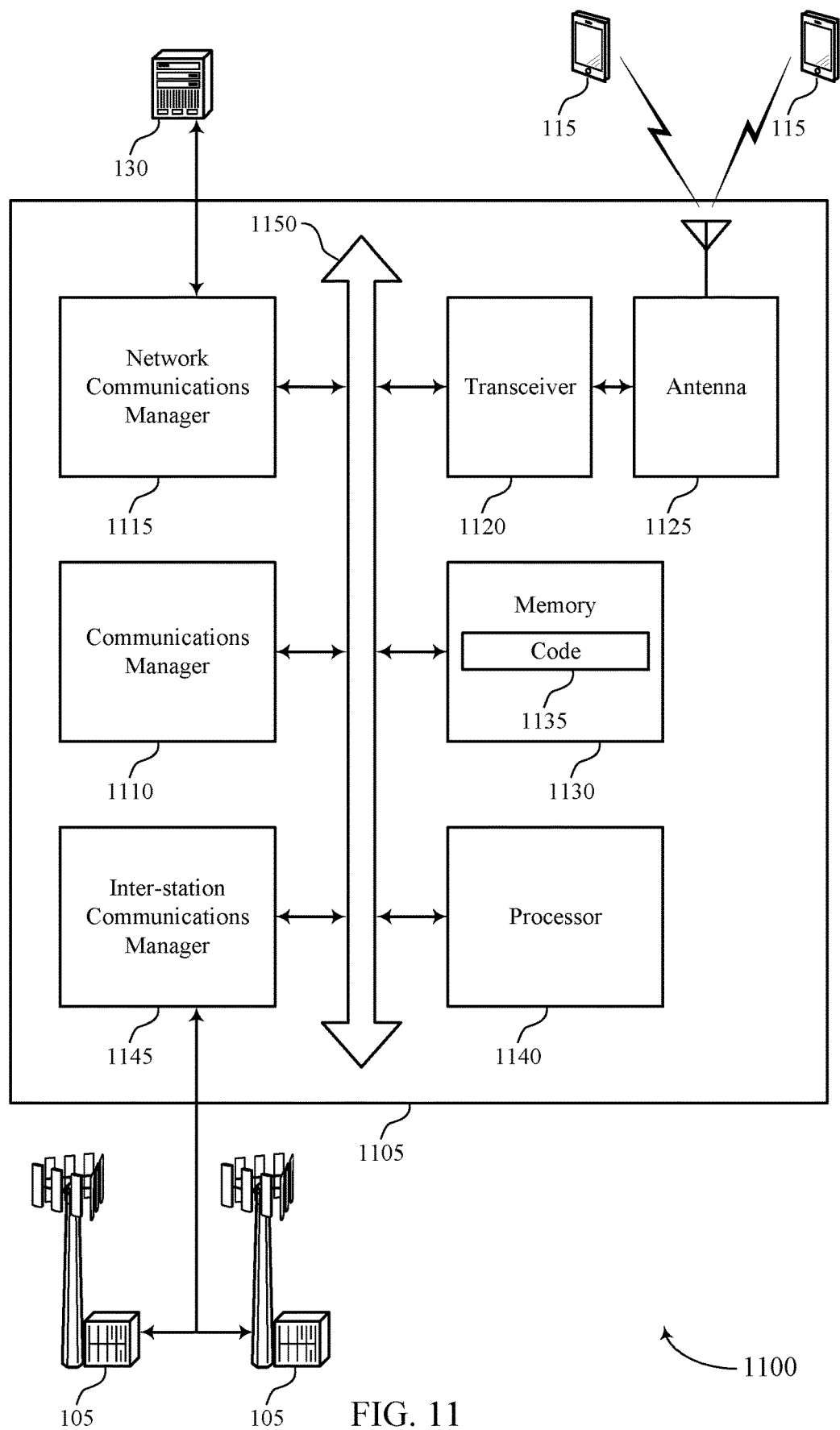
FIG. 11 shows a diagram of an example system including a device that supports group reference signal triggering for contention-based systems.

FIG. 11 shows a diagram of an example system 1100 including a device 1105 that supports group reference signal triggering for contention-based systems. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (such as bus 1150).

The communications manager 1110 may identify a set of time-frequency resources of a shared radio frequency band for transmission of respective reference signals from each UE of a set of UEs, transmit a group common control channel configured to trigger transmission of a reference signal from a UE of the set of UEs, the group common control channel indicating timing information corresponding to the set of time-frequency resources for transmission of the respective reference signals, and monitor for at least one of the respective reference signals based on the timing information and the set of time-frequency resources.

The network communications manager 1115 may manage communications with the core network (such as via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 also may include a modem to modulate the packets and provide the modulated packets to the antennas for transmission, and to demodulate packets received from the antennas.

In some implementations, the device 1105 may include a single antenna 1125, or in some implementations, the device 1105 may have more than one antenna 1125, which may be capable of concurrently transmitting or receiving multiple wireless transmissions.

The processor 1140 of the device 1105 may interface with other components of the device 1105, and may process information received from other components (such as inputs or signals), output information to other components, etc. For example, a chip or modem of the device 1105 may include a processing system, a first interface to transmit information, and a second interface for monitoring for information. In some implementations, the first interface may refer to an interface between the processing system of the chip or modem and the transceiver 1120, such that the device 1105 may transmit information output from the chip or modem. In some implementations, the second interface may refer to an interface between the processing system of the chip or modem and the transceiver 1120, such that the device 1105 may monitor for information or signal inputs, and the information may be passed to the processing system.

The inter-station communications manager 1145 may manage communications with other base station(s) 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some implementations, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some implementations, the code 1135 may not be directly executable by the processor 1140 but may cause a computer (such as when compiled and executed) to perform functions described herein.

Figure 12:
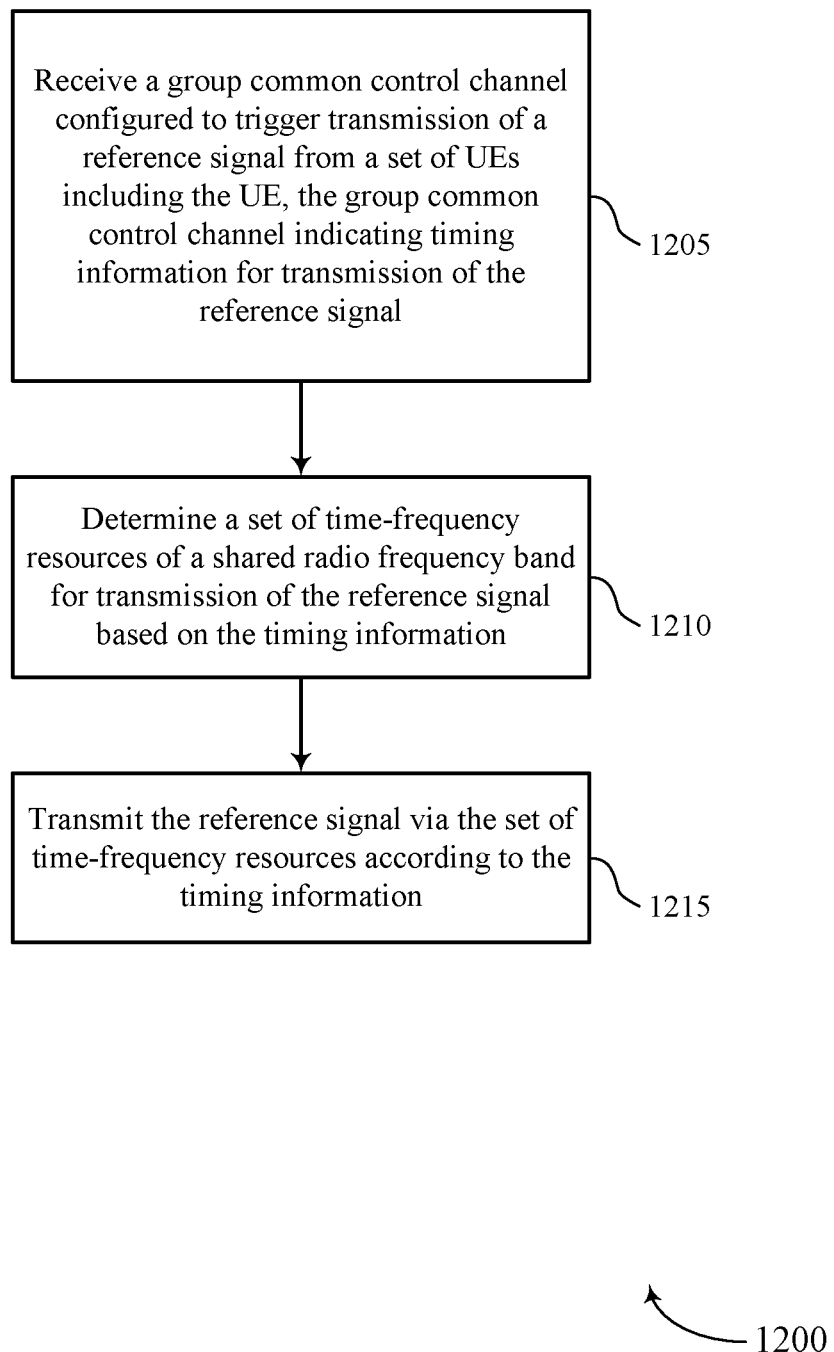
FIGS. 12-15 show flowcharts illustrating example methods that support group reference signal triggering for contention-based systems.

FIG. 12 shows a flowchart illustrating an example method 1200 that supports group reference signal triggering for contention-based systems. The operations of method 1200 may be implemented by a UE 115 or its components as described herein. For example, the operations of method 1200 may be performed by a communications manager as described with reference to FIGS. 4-7. In some implementations, a UE may execute a set of instructions to control the functional elements of the UE to perform the functions described herein. Additionally, or alternatively, a UE may perform aspects of the functions described herein using special-purpose hardware.

At 1205, the UE may receive a group common control channel configured to trigger transmission of a reference signal from a set of UEs including the UE, the group common control channel indicating timing information for transmission of the reference signal. The operations of 1205 may be performed according to the methods described herein. In some implementations, aspects of the operations of 1205 may be performed by a channel receiver as described with reference to FIGS. 4-7.

At 1210, the UE may determine a set of time-frequency resources of a shared radio frequency band for transmission of the reference signal based on the timing information. The operations of 1210 may be performed according to the methods described herein. In some implementations, aspects of the operations of 1210 may be performed by a resource manager as described with reference to FIGS. 4-7.

At 1215, the UE may transmit the reference signal via the set of time-frequency resources according to the timing information. The operations of 1215 may be performed according to the methods described herein. In some implementations, aspects of the operations of 1215 may be performed by a signaling component as described with reference to FIGS. 4-7.

Figure 13:
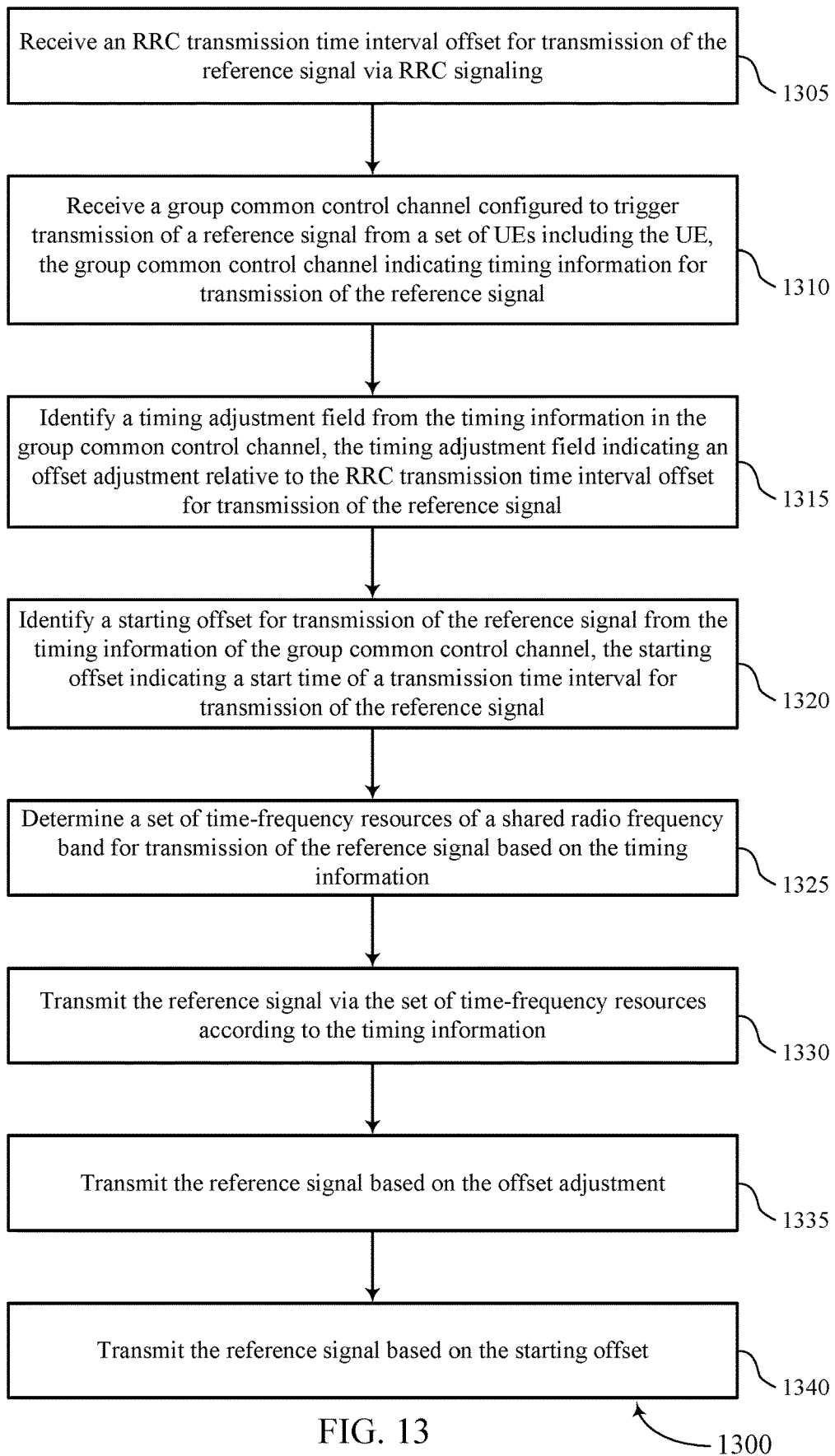

FIG. 13 shows a flowchart illustrating an example method 1300 that supports group reference signal triggering for contention-based systems. The operations of method 1300 may be implemented by a UE 115 or its components as described herein. For example, the operations of method 1300 may be performed by a communications manager as described with reference to FIGS. 4-7. In some implementations, a UE may execute a set of instructions to control the functional elements of the UE to perform the functions described herein. Additionally, or alternatively, a UE may perform aspects of the functions described herein using special-purpose hardware.

At 1305, the UE may receive an RRC transmission time interval offset for transmission of the reference signal via RRC signaling. The operations of 1305 may be performed according to the methods described herein. In some implementations, aspects of the operations of 1305 may be performed by a timing manager as described with reference to FIGS. 4-7.

At 1310, the UE may receive a group common control channel configured to trigger transmission of a reference signal from a set of UEs including the UE, the group common control channel indicating timing information for transmission of the reference signal. The operations of 1310 may be performed according to the methods described herein. In some implementations, aspects of the operations of 1310 may be performed by a channel receiver as described with reference to FIGS. 4-7.

At 1315, the UE may identify a timing adjustment field from the timing information in the group common control channel, the timing adjustment field indicating an offset adjustment relative to the RRC transmission time interval offset for transmission of the reference signal. The operations of 1315 may be performed according to the methods described herein. In some implementations, aspects of the operations of 1315 may be performed by a timing identifier as described with reference to FIGS. 4-7.

At 1320, the UE may identify a starting offset for transmission of the reference signal from the timing information of the group common control channel, the starting offset indicating a start time of a transmission time interval for transmission of the reference signal. The operations of 1320 may be performed according to the methods described herein. In some implementations, aspects of the operations of 1320 may be performed by an offset identifier as described with reference to FIGS. 4-7.

At 1325, the UE may determine a set of time-frequency resources of a shared radio frequency band for transmission of the reference signal based on the timing information. The operations of 1325 may be performed according to the methods described herein. In some implementations, aspects of the operations of 1325 may be performed by a resource manager as described with reference to FIGS. 4-7.

At 1330, the UE may transmit the reference signal via the set of time-frequency resources according to the timing information. The operations of 1330 may be performed according to the methods described herein. In some implementations, aspects of the operations of 1330 may be performed by a signaling component as described with reference to FIGS. 4-7.

At 1335, the UE may transmit the reference signal based on the offset adjustment. The operations of 1335 may be performed according to the methods described herein. In some implementations, aspects of the operations of 1335 may be performed by a signaling component as described with reference to FIGS. 4-7.

At 1340, the UE may transmit the reference signal based on the starting offset. The operations of 1340 may be performed according to the methods described herein. In some implementations, aspects of the operations of 1340 may be performed by a signaling component as described with reference to FIGS. 4-7.

Figure 14:
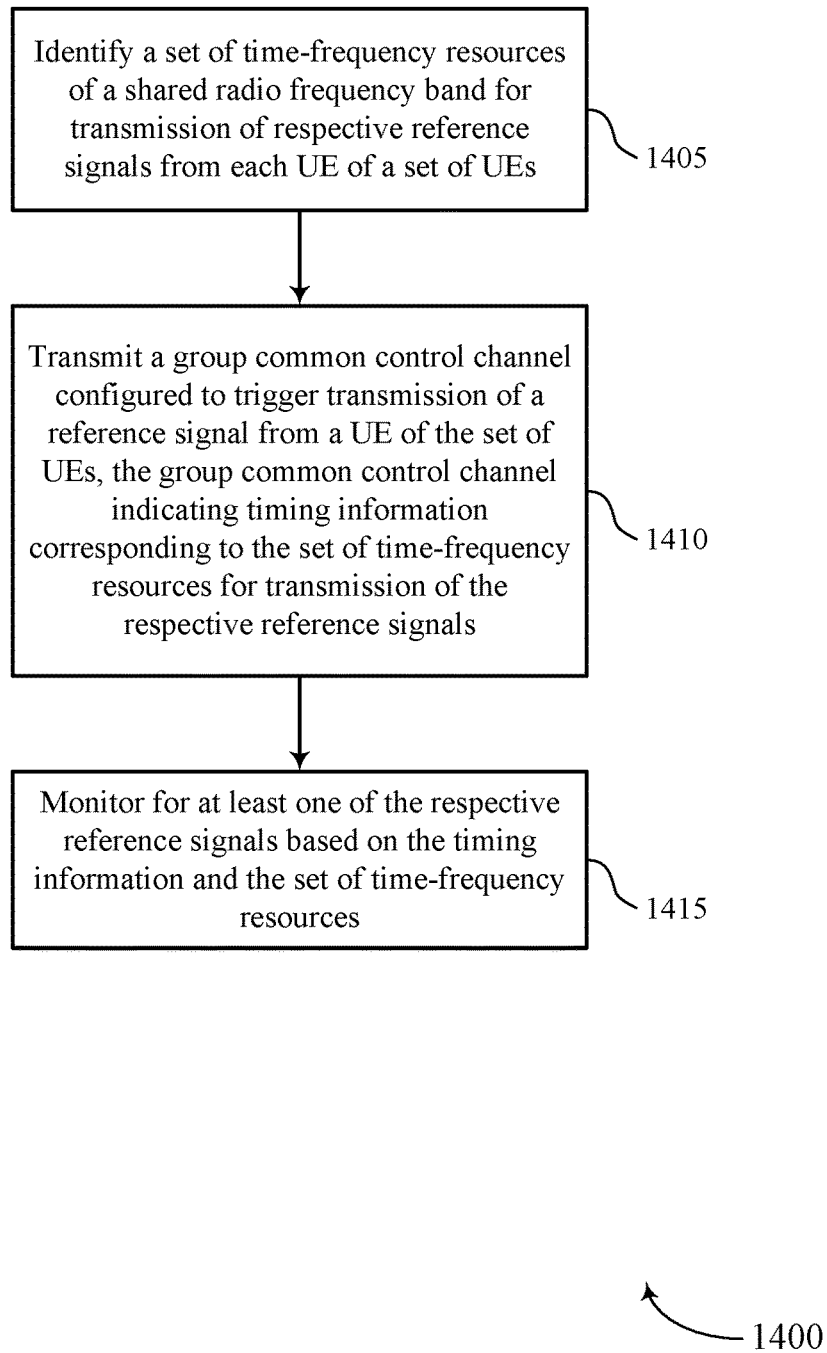

FIG. 14 shows a flowchart illustrating an example method 1400 that supports group reference signal triggering for contention-based systems. The operations of method 1400 may be implemented by a base station 105 or its components as described herein. For example, the operations of method 1400 may be performed by a communications manager as described with reference to FIGS. 8-11. In some implementations, a base station may execute a set of instructions to control the functional elements of the base station to perform the functions described herein. Additionally, or alternatively, a base station may perform aspects of the functions described herein using special-purpose hardware.

At 1405, the base station may identify a set of time-frequency resources of a shared radio frequency band for transmission of respective reference signals from each UE of a set of UEs. The operations of 1405 may be performed according to the methods described herein. In some implementations, aspects of the operations of 1405 may be performed by a resource component as described with reference to FIGS. 8-11.

At 1410, the base station may transmit a group common control channel configured to trigger transmission of a reference signal from a UE of the set of UEs, the group common control channel indicating timing information corresponding to the set of time-frequency resources for transmission of the respective reference signals. The operations of 1410 may be performed according to the methods described herein. In some implementations, aspects of the operations of 1410 may be performed by a channel manager as described with reference to FIGS. 8-11.

At 1415, the base station may monitor for at least one of the respective reference signals based on the timing information and the set of time-frequency resources. The operations of 1415 may be performed according to the methods described herein. In some implementations, aspects of the operations of 1415 may be performed by a signal monitor as described with reference to FIGS. 8-11.

Figure 15:
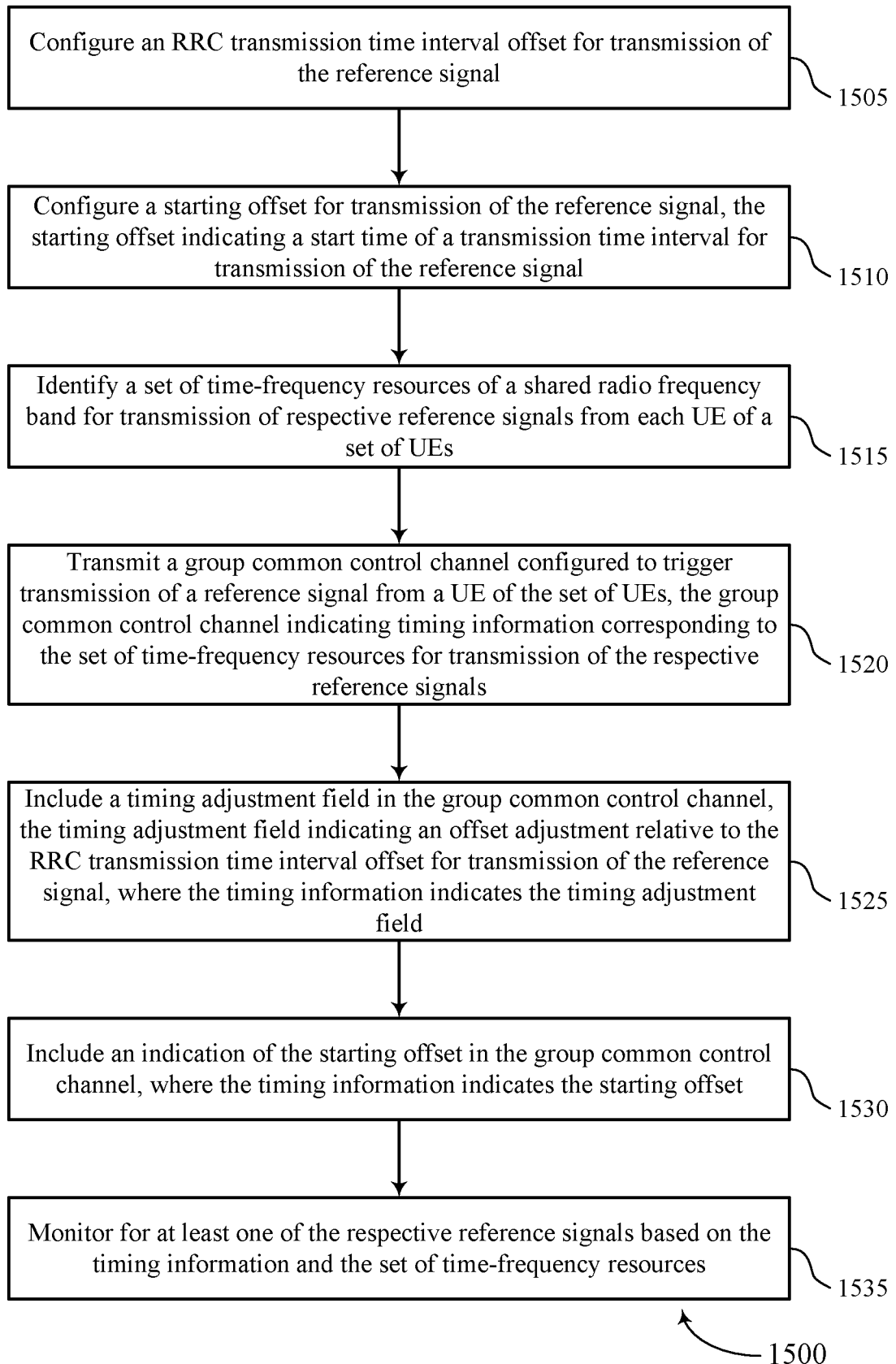

FIG. 15 shows a flowchart illustrating an example method 1500 that supports group reference signal triggering for contention-based systems. The operations of method 1500 may be implemented by a base station 105 or its components as described herein. For example, the operations of method 1500 may be performed by a communications manager as described with reference to FIGS. 8-11. In some implementations, a base station may execute a set of instructions to control the functional elements of the base station to perform the functions described herein. Additionally, or alternatively, a base station may perform aspects of the functions described herein using special-purpose hardware.

At 1505, the base station may configure an RRC transmission time interval offset for transmission of the reference signal. The operations of 1505 may be performed according to the methods described herein. In some implementations, aspects of the operations of 1505 may be performed by an RRC component as described with reference to FIGS. 8-11.

At 1510, the base station may configure a starting offset for transmission of the reference signal, the starting offset indicating a start time of a transmission time interval for transmission of the reference signal. The operations of 1510 may be performed according to the methods described herein. In some implementations, aspects of the operations of 1510 may be performed by an offset configuration manager as described with reference to FIGS. 8-11.

At 1515, the base station may identify a set of time-frequency resources of a shared radio frequency band for transmission of respective reference signals from each UE of a set of UEs. The operations of 1515 may be performed according to the methods described herein. In some implementations, aspects of the operations of 1515 may be performed by a resource component as described with reference to FIGS. 8-11.

At 1520, the base station may transmit a group common control channel configured to trigger transmission of a reference signal from a UE of the set of UEs, the group common control channel indicating timing information corresponding to the set of time-frequency resources for transmission of the respective reference signals. The operations of 1520 may be performed according to the methods described herein. In some implementations, aspects of the operations of 1520 may be performed by a channel manager as described with reference to FIGS. 8-11.

At 1525, the base station may include a timing adjustment field in the group common control channel, the timing adjustment field indicating an offset adjustment relative to the RRC transmission time interval offset for transmission of the reference signal, where the timing information indicates the timing adjustment field. The operations of 1525 may be performed according to the methods described herein. In some implementations, aspects of the operations of 1525 may be performed by a timing component as described with reference to FIGS. 8-11.

At 1530, the base station may include an indication of the starting offset in the group common control channel, where the timing information indicates the starting offset. The operations of 1530 may be performed according to the methods described herein. In some implementations, aspects of the operations of 1530 may be performed by an offset configuration manager as described with reference to FIGS. 8-11.

At 1535, the base station may monitor for at least one of the respective reference signals based on the timing information and the set of time-frequency resources. The operations of 1535 may be performed according to the methods described herein. In some implementations, aspects of the operations of 1535 may be performed by a signal monitor as described with reference to FIGS. 8-11.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described herein as acting in certain combinations and even initially claimed as such, one or more features from a claimed combination can in some implementations be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described herein should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communications at a user equipment (UE), comprising:
   a first interface configured to obtain a control signal indicating a slot offset for reference signal transmission by a plurality of UEs comprising the UE;
   the first interface configured to:
      monitor for a group common control channel configured to trigger transmission of respective reference signals by the plurality of UEs; and
      monitor a resource block associated with the group common control channel to determine a respective timing adjustment for transmission of one or more of the respective reference signals, wherein the resource block corresponds to a group of UEs of the plurality of UEs comprising the UE;
   a processor configured to determine a set of time-frequency resources for the transmission of one or more of the respective reference signals based at least in part on the respective timing adjustment and the slot offset; and
   a second interface configured to output the one or more of the respective reference signals for transmission via the set of time-frequency resources.

2. The apparatus of claim 1, wherein:
   the processor is further configured to perform a listen before talk (LBT) procedure; and
   the second interface is further configured to output the one or more of the respective reference signals over a channel of a shared radio frequency band based at least in part on a successful LBT procedure.

3. The apparatus of claim 1, wherein:
   the processor is further configured to determine time resources of the set of time-frequency resources for the transmission of the one or more of the respective reference signals based at least in part on a channel occupancy time (COT) of a network device, wherein the time resources are within an interval associated with the COT.

4. The apparatus of claim 1, wherein:
   the processor is further configured to identify downlink control information (DCI) in the group common control channel, wherein a format of the DCI excludes a power control command.

5. The apparatus of claim 1, wherein:
   the processor is further configured to identify downlink control information (DCI) in the group common control channel, wherein a format of the DCI includes a power control command; and
   the first interface is further configured to obtain a radio resource control (RRC) configuration by a network device, wherein the RRC configuration comprises an indication to ignore the power control command.

6. The apparatus of claim 1, wherein:
   the processor is further configured to identify that the set of time-frequency resources is for the plurality of UEs comprising the UE based at least in part on the obtained group common control channel.

7. The apparatus of claim 1, wherein:
   the first interface is further configured to obtain a radio resource control (RRC) transmission time interval offset for the transmission of the one or more of the respective reference signals via RRC signaling;

the processor is further configured to identify the respective timing adjustment based at least in part on a timing adjustment field in the group common control channel, the respective timing adjustment comprising an offset adjustment relative to the RRC transmission time interval offset for the transmission of the one or more of the respective reference signals; and the second interface is further configured to output the one or more the respective reference signals based at least in part on the offset adjustment.

8. The apparatus of claim 7, wherein:
the timing adjustment field is configured for the plurality of UEs comprising the UE.

9. The apparatus of claim 1, wherein:
the processor is further configured to identify a starting offset for the transmission of the one or more of the respective reference signals based at least in part on the respective timing adjustment of the group common control channel, the starting offset indicating a start time of a transmission time interval for the transmission of the respective reference signals; and output the one or more of the respective reference signals based at least in part on the starting offset.

10. The apparatus of claim 9, wherein:
the starting offset is configured for multiple UEs of the plurality of UEs.

11. The apparatus of claim 9, wherein:
the starting offset is configured for the plurality of UEs.

12. The apparatus of claim 1, wherein:
the processor is further configured to identify a listen before talk (LBT) category for the transmission of the one or more of the respective reference signals based at least in part on the group common control channel indicating the respective timing adjustment for the transmission of the respective reference signals;

the processor is further configured to perform an LBT procedure corresponding to the LBT category; and the second interface is further configured to output the one or more of the respective reference signals for transmission over the set of time-frequency resources based at least in part on a successful LBT procedure.

13. The apparatus of claim 1, wherein:
the respective reference signals comprise one or more sounding reference signals.

14. An apparatus for wireless communications, comprising:
a processor configured to identify a set of time-frequency resources for transmission of respective reference signals by a plurality of UEs; and a first interface configured to output for transmission a group common control channel for the plurality of UEs, the group common control channel being configured to trigger transmission of the respective reference signals by the plurality of UEs, the group common control channel indicating a plurality of resource blocks associated with respective timing adjustments for the transmission of one or more of the respective reference signals, wherein a resource block of the plurality of resource blocks corresponds to a group of UEs configured to monitor for different respective timing adjustments via different resource blocks, and wherein the processor is further configured to monitor for the one or more of the respective reference signals based at least in part on the respective timing adjustments, a slot offset for the triggered transmission of the respective reference signals by the plurality of UEs, and the set of time-frequency resources.

15. The apparatus of claim 14, wherein:
the processor is further configured to perform a listen before talk (LBT) procedure;
the processor is further configured to gain access to a shared radio frequency band for a channel occupancy time (COT) based at least in part on a successful LBT procedure; and
the set of time-frequency resources is identified based at least in part on the COT.

16. The apparatus of claim 15, wherein:
the processor is further configured to determine time resources of the set of time-frequency resources based at least in part on the COT, wherein the time resources are within an interval associated with the COT.

17. The apparatus of claim 14, wherein:
the processor is further configured to include downlink control information (DCI) in the group common control channel, wherein a format of the DCI excludes a power control command.

18. The apparatus of claim 14, wherein:
the processor is further configured to include downlink control information (DCI) in the group common control channel, wherein a format of the DCI includes a power control command; and
the first interface is further configured to output a radio resource control (RRC) configuration for transmission to the UE, wherein the RRC configuration comprises an indication to ignore the power control command.

19. The apparatus of claim 14, wherein:
the processor is further configured to determine respective sets of time-frequency resources for respective UEs of the plurality of UEs, wherein the group common control channel includes an indication of the respective sets of time-frequency resources.

20. The apparatus of claim 14, wherein:
the processor is further configured to configure a radio resource control (RRC) transmission time interval offset for the transmission of the respective reference signals; and
the processor is further configured to include a timing adjustment field in the group common control channel, the timing adjustment field indicating the respective timing adjustments comprising an offset adjustment relative to the RRC transmission time interval offset for the transmission of the respective reference signals.

21. The apparatus of claim 14, wherein:
the processor is further configured to configure respective timing adjustment fields for respective groups of UEs of the plurality of UEs, wherein the respective timing adjustment fields are included in the group common control channel.

22. The apparatus of claim 14, wherein:
the first interface is further configured to output an indication of an radio resource control (RRC) transmission time interval offset via RRC signaling.

23. The apparatus of claim 14, wherein:
the processor is further configured to configure a starting offset for the transmission of the respective reference signals, the starting offset indicating a start time of a transmission time interval for the transmission of the respective reference signals; and
the processor is further configured to include an indication of the starting offset in the group common control channel, wherein the respective timing adjustments indicates the starting offset.

24. The apparatus of claim 23, wherein:
the starting offset is configured for multiple UEs of the plurality of UEs.

25. The apparatus of claim 23, wherein:
the processor is further configured to configure respective starting offsets for respective groups of UEs of the plurality of UEs, wherein the respective starting offsets are included in the respective timing adjustments of the group common control channel.

26. The apparatus of claim 14, wherein:
the processor is further configured to identify a listen before talk (LBT) category for the transmission of the respective reference signals; and
the processor is further configured to include an indication of the LBT category in the group common control channel.

27. The apparatus of claim 14, wherein:
the respective reference signals comprise one or more sounding reference signals.

28. A method for wireless communications at a user equipment (UE), comprising:
receiving a control signal indicating a slot offset for reference signal transmission by a plurality of UEs comprising the UE;
monitoring for a group common control channel configured to trigger transmission of respective reference signals by the plurality of UEs;
monitoring a resource block associated with the group common control channel to determine a respective timing adjustment for transmission of one or more of the respective reference signals, wherein the resource block corresponds to a group of UEs of the plurality of UEs comprising the UE;
determining a set of time-frequency resources for the transmission of the one or more of the respective reference signals based at least in part on the respective timing adjustment and the slot offset; and
transmitting the one or more of the respective reference signals via the set of time-frequency resources.

29. The method of claim 28, further comprising:
performing a listen before talk (LBT) procedure; and
transmitting the one or more of the respective reference signals over a channel of a shared radio frequency band based at least in part on a successful LBT procedure.

30. A method for wireless communications at a network device, comprising:
identifying a set of time-frequency resources for transmission of respective reference signals by a plurality of UEs;
transmitting a group common control channel for the plurality of UEs, the group common control channel being configured to trigger transmission of the respective reference signals by the plurality of UEs, the group common control channel indicating a plurality of resource blocks associated with respective timing adjustments for the transmission of one or more of the respective reference signals, wherein a resource block of the plurality of resource blocks corresponds to a group of UEs configured to monitor for different respective timing adjustments via different resource; and
monitoring for the one or more of the respective reference signals based at least in part on the respective timing adjustments, a slot offset for the triggered transmission of the respective reference signals by the plurality of UEs, and the set of time-frequency resources.

* * * * *